US007502770B2

(12) United States Patent
Hillis et al.

(10) Patent No.: US 7,502,770 B2
(45) Date of Patent: Mar. 10, 2009

(54) KNOWLEDGE WEB

(75) Inventors: W. Daniel Hillis, Toluca Lake, CA (US); Bran Ferren, Beverly Hills, CA (US)

(73) Assignee: Metaweb Technologies, Inc., San Francisco, CA (US)

( * ) Notice: Subject to any disclaimer, the term of this patent is extended or adjusted under 35 U.S.C. 154(b) by 422 days.

(21) Appl. No.: 10/474,155

(22) PCT Filed: Apr. 10, 2002

(86) PCT No.: PCT/US02/11434

§ 371 (c)(1),
(2), (4) Date: Oct. 1, 2003

(87) PCT Pub. No.: WO02/084590

PCT Pub. Date: Oct. 24, 2002

(65) Prior Publication Data

US 2005/0086188 A1   Apr. 21, 2005

(51) Int. Cl.
*G06N 5/00* (2006.01)

(52) U.S. Cl. .................. 706/45; 706/1; 706/3; 434/118

(58) Field of Classification Search ..................... 706/1, 706/21, 45, 47, 3; 434/322, 362, 118, 350
See application file for complete search history.

(56) References Cited

U.S. PATENT DOCUMENTS 2,895,005 A   7/1959   Kock et al.

(Continued)

FOREIGN PATENT DOCUMENTS

EP   1 182 590   2/2002

(Continued)

OTHER PUBLICATIONS

Nelson, C., "Use of Metadata Registries for Searching for Statistical Data," Jul. 24-26, 2002, Dimension EDI Ltd., Proceedings of the 14th International Conference on Scientific and Statistical Database Management, pp. 232-235.

(Continued)

*Primary Examiner*—Wilbert L Starks, Jr.
(74) *Attorney, Agent, or Firm*—Michael A. Glenn; Glenn Patent Group

(57) ABSTRACT

A system and method for organizing knowledge in such a way that humans can find knowledge, learn from it, and add to it as needed is disclosed. The exemplary system has four components: a knowledge base, a learning model and an associated tutor, a set of user tools, and a backend system. The invention also preferably comprises a set of application programming interfaces (APIs) that allow these components to work together, so that other people can create their own versions of each of the components. In the knowledge web a community of people with knowledge to share put knowledge in the database using the user tools. The knowledge may be in the form of documents or other media, or it may be a descriptor of a book or other physical source. Each piece of knowledge is associated with various types of meta-knowledge about what the knowledge is for, what form it is in, and so on. The information in the knowledge base can be created specifically for the knowledge base, but it can also consist of information converted from other sources, such as scientific documents, books, journals, Web pages, film, video, audio files, and course notes. The initial content of the knowledge web comprises existing curriculum materials, books and journals, and those explanatory pages that are already on the World Wide Web. These existing materials already contain most of the information, examples, problems, illustrations, even lesson plans, that the knowledge web needs. The knowledge base thus represents the core content (online documents or references to online or offline documents); the meta-knowledge that was created at the time of entry; and a number of user annotations and document metadata that accumulate over time about the usefulness of the knowledge, additional user opinions, certifications of its veracity and usefulness, commentary, and connections between various units of knowledge.

46 Claims, 23 Drawing Sheets

U.S. PATENT DOCUMENTS

| | | |
|---|---|---|
| 3,116,365 A | 12/1963 | Prescott |
| 3,992,586 A | 11/1976 | Jaffe |
| 4,688,443 A | 8/1987 | Fabre et al. |
| 4,847,784 A | 7/1989 | Clancey ............... 364/513 |
| 4,853,873 A | 8/1989 | Tsuji et al. ............ 364/513 |
| 4,881,135 A | 11/1989 | Heilweil |
| 4,992,940 A | 2/1991 | Dworkin |
| 4,996,642 A | 2/1991 | Hey |
| 5,073,934 A | 12/1991 | Matyas et al. |
| 5,117,258 A | 5/1992 | Iwata |
| 5,133,045 A | 7/1992 | Gaither et al. ........ 395/51 |
| 5,212,768 A | 5/1993 | Itsuki et al. .......... 395/54 |
| 5,404,295 A | 4/1995 | Katz et al. |
| 5,404,305 A | 4/1995 | Stiles, Jr. |
| 5,426,510 A | 6/1995 | Meredith |
| 5,430,473 A | 7/1995 | Beecher, II et al. |
| 5,500,671 A | 3/1996 | Anderson et al. |
| 5,511,122 A | 4/1996 | Atkinson |
| 5,597,312 A * | 1/1997 | Bloom et al. ......... 434/362 |
| 5,598,209 A | 1/1997 | Cortjens et al. |
| 5,612,734 A | 3/1997 | Nelson et al. |
| 5,678,999 A | 10/1997 | Cicare |
| 5,701,400 A | 12/1997 | Amado |
| H1728 H | 5/1998 | Kelso et al. |
| 5,751,337 A | 5/1998 | Allen et al. |
| 5,751,809 A | 5/1998 | Davis et al. |
| 5,867,799 A | 2/1999 | Lang et al. |
| 5,907,619 A | 5/1999 | Davis |
| 5,940,513 A | 8/1999 | Aucsmith et al. |
| 5,956,404 A | 9/1999 | Schneier et al. |
| 5,960,411 A | 9/1999 | Hartman et al. |
| 5,963,245 A | 10/1999 | McDonald |
| 5,995,624 A | 11/1999 | Fielder et al. |
| 6,003,021 A | 12/1999 | Zadik et al. |
| 6,009,173 A | 12/1999 | Sumner |
| 6,070,149 A | 5/2000 | Tavor et al. |
| 6,076,091 A | 6/2000 | Fohn et al. |
| 6,076,163 A | 6/2000 | Hoffstein et al. |
| 6,098,065 A | 8/2000 | Skillen et al. |
| 6,125,445 A | 9/2000 | Arditti et al. |
| 6,131,162 A | 10/2000 | Yoshiura et al. |
| 6,171,109 B1 | 1/2001 | Ohsuga |
| 6,185,558 B1 | 2/2001 | Bowman et al. |
| 6,202,060 B1 | 3/2001 | Tran |
| 6,202,062 B1 | 3/2001 | Cameron et al. |
| 6,226,742 B1 | 5/2001 | Jakubowski et al. |
| 6,230,269 B1 | 5/2001 | Spies et al. |
| 6,283,757 B1 | 9/2001 | Meghnot et al. |
| 6,292,211 B1 | 9/2001 | Pena |
| 6,311,194 B1 | 10/2001 | Sheth et al. ........... 707/505 |
| 6,341,960 B1 * | 1/2002 | Frasson et al. ........ 434/322 |
| 6,347,333 B2 | 2/2002 | Eisendrath et al. |
| 6,401,206 B1 | 6/2002 | Khan et al. |
| 6,405,175 B1 | 6/2002 | Ng |
| 6,438,691 B1 | 8/2002 | Mao |
| 6,471,586 B1 | 10/2002 | Aiki et al. |
| 6,477,520 B1 | 11/2002 | Malaviya et al. |
| 6,499,105 B1 | 12/2002 | Yoshiura et al. |
| 6,507,357 B2 | 1/2003 | Hillis et al. |
| 6,535,880 B1 | 3/2003 | Musgrove et al. |
| 6,633,981 B1 | 10/2003 | Davis |
| 6,714,234 B1 | 3/2004 | Hillis et al. |
| 6,732,090 B2 | 5/2004 | Shanahan et al. |
| 6,751,733 B1 | 6/2004 | Nakamura et al. |
| 6,789,126 B1 | 9/2004 | Saulpaugh et al. |
| 6,807,535 B2 * | 10/2004 | Goodkovsky ............ 706/3 |
| 6,827,578 B2 * | 12/2004 | Krebs et al. ............ 434/118 |
| 6,856,968 B2 | 2/2005 | Cooley et al. |
| 6,884,074 B2 * | 4/2005 | Theilmann ............. 434/118 |
| 6,975,833 B2 * | 12/2005 | Theilmann et al. ..... 434/350 |
| 6,980,974 B2 * | 12/2005 | Kobayashi et al. ...... 706/21 |
| 6,988,198 B1 | 1/2006 | Zuccherato et al. |
| 7,000,118 B1 | 2/2006 | Murthy et al. |
| 7,100,051 B1 | 8/2006 | Kipnis et al. |
| 7,263,529 B2 | 8/2007 | Cordery et al. |
| 2001/0034837 A1 | 10/2001 | Kauski et al. |
| 2002/0013780 A1 | 1/2002 | Brown et al. |
| 2002/0016840 A1 | 2/2002 | Herzog et al. |
| 2002/0023093 A1 | 2/2002 | Ziff et al. |
| 2002/0026583 A1 | 2/2002 | Harrison et al. |
| 2002/0049692 A1 | 4/2002 | Venkatram |
| 2002/0069079 A1 | 6/2002 | Vega |
| 2002/0072410 A1 | 6/2002 | Tanaka et al. |
| 2002/0073080 A1 | 6/2002 | Lipkin |
| 2002/0091836 A1 | 7/2002 | Moetteli |
| 2002/0095579 A1 | 7/2002 | Yoshiura et al. |
| 2002/0126120 A1 | 9/2002 | Snowdon et al. |
| 2002/0161603 A1 | 10/2002 | Gonzales |
| 2003/0093790 A1 | 5/2003 | Logan et al. |
| 2003/0134675 A1 | 7/2003 | Oberberger |
| 2003/0152893 A1 | 8/2003 | Edgar |
| 2003/0187841 A1 | 10/2003 | Zhang et al. |
| 2003/0188180 A1 | 10/2003 | Overney |
| 2003/0195834 A1 | 10/2003 | Hillis et al. |
| 2004/0097852 A1 | 5/2004 | Boyd et al. |
| 2004/0205448 A1 | 10/2004 | Grefenstette et al. |
| 2005/0060283 A1 | 3/2005 | Petras et al. |
| 2005/0107912 A1 | 5/2005 | Martin et al. |
| 2005/0119053 A1 | 6/2005 | Suzuki et al. |
| 2005/0245316 A1 | 11/2005 | Tanaka et al. |

FOREIGN PATENT DOCUMENTS

| | | |
|---|---|---|
| JP | 04322649 | 11/1992 |
| JP | 08084328 | 3/1996 |
| WO | WO 00/05666 | 2/2000 |
| WO | WO 01/01313 | 1/2001 |

OTHER PUBLICATIONS

Anguish Scott, "Storing your application's preferences and Support files," Jan. 14, 1998, Stepwise Server, http:..www.stepwise.com.Articles/Technical/ApplicationStorage.html.

Michael Margolis and David Resnick; Third Voice: Vox Populi Vox Dei?; Oct. 1999; First Monday, vol. 4, No. 10; pp. 1-5; downloaded from: worldwideweb.firstmonday.org/issues/issue4_10/margolis/index.html.

* cited by examiner

Affordances of Various Forms of Publishing

|  | The Web | News Groups | Text Books | Journals |
|---|---|---|---|---|
| Peer-to-Peer publishing | Yes | Yes | No | Limited |
| Supports linking | Yes | Limited | No | Limited |
| Ability to add annotations | No | Yes | No | No |
| Vetting and certification | No | Limited | Yes | Yes |
| Supports payment model | Limited | No | Yes | Yes |
| Supports guided learning | Limited | No | Yes | No |

FIG. 1

$$H = \begin{bmatrix}
1 1 0 0 1 1 0 0 1 1 0 0 1 1 0 0 1 0 1 0 1 0 1 0 1 0 1 0 1 0 1 0 \\
1 1 0 0 0 0 1 1 1 1 0 0 0 1 1 1 0 0 1 1 0 0 1 1 0 0 1 1 0 0 1 1 \\
0 0 1 1 1 1 0 0 0 1 1 1 1 0 0 0 1 1 0 0 1 1 0 0 1 1 0 0 1 1 0 0 \\
0 0 1 1 0 0 1 1 0 0 1 1 0 0 1 1 0 1 0 1 0 1 0 1 0 1 0 1 0 1 0 1 \\
1 0 1 0 1 0 1 0 1 0 1 0 1 0 1 0 0 0 0 0 0 0 0 0 1 1 1 1 1 1 1 1 \\
1 0 1 0 0 1 0 1 1 0 1 0 0 1 0 1 1 0 0 1 1 1 1 0 0 1 1 0 0 1 1 0 \\
0 1 0 1 1 0 1 0 0 1 0 1 1 0 1 1 0 0 1 1 0 0 0 1 1 0 0 1 1 0 1 1 \\
0 1 0 1 0 1 0 1 0 1 0 1 0 1 1 1 1 1 1 1 1 1 0 0 0 0 0 0 0 0 0 0 \\
1 1 0 0 1 1 0 0 0 0 1 1 0 0 1 1 1 0 1 0 0 1 0 1 1 0 1 0 0 1 0 1 \\
1 1 0 0 0 0 1 1 0 0 1 1 1 1 0 0 1 0 0 1 0 1 1 0 1 0 0 1 0 1 1 0 \\
0 0 1 1 1 1 0 0 1 1 0 0 0 0 1 1 0 1 1 0 1 0 0 1 0 1 1 0 1 0 0 1 \\
0 0 1 1 0 0 1 1 1 1 0 0 1 1 0 0 0 1 0 1 1 0 1 1 0 0 1 0 1 1 0 1 0 \\
1 0 1 0 1 0 1 0 0 1 0 1 0 1 0 1 0 0 0 1 1 1 1 1 1 1 1 0 0 0 0 \\
1 0 1 0 0 1 0 1 0 1 1 0 1 0 0 0 1 1 1 1 0 0 1 1 0 0 0 0 1 1 \\
0 1 0 1 1 0 1 0 1 0 1 0 0 1 0 1 1 1 0 0 0 0 1 1 0 0 1 1 1 1 0 0 \\
0 1 0 1 0 1 0 1 1 0 1 0 1 0 1 0 1 1 1 1 0 0 0 0 0 0 0 0 1 1 1 1
\end{bmatrix}$$

FIG. 7

FIG. 19A promptly if they any abnormal vaginal bleeding between scheduled exams.

3. Does tamoxifen cause blood clots or stroke?

Data from large treatment studies suggest that there is a small increase in the number of blood clots in women taking tamoxifen, particularly in women who are receiving anticancer drugs (chemotherapy <http://cancernet. nci.nih.gov/dictionary/dictionaryfull.html>) along with tamoxifen. The total number of women who have experienced this side effect is small. The risk of having a blood clot due to tamoxifen is similar to the risk of a blood clot when taking estrogen replacement therapy.

Women in the BCPT who took tamoxifen also had an increased chance in developing blood clots and an increased chance of stroke.

4. Does tamoxifen caus| C.N. Reilly, MD, PhD, Johns Hopkins
Other studies have suggested that there are
also psychological effects as well... |inside the eye). Women taking tamoxifen appear to be at increased risk for developing cataracts. Other eye problems, such as corneal scarring or retinal change have been reported in a few patients.

5. Does tamoxifen cause other types of cancer?

Although tamoxifen can cause liver <http://cancernet.nci.nih.gov/dictionary/dictionaryfull.html> cancer in particular strains of rats, it is not known to cause cancer in humans. It is clear, however, that tamoxifen can sometimes cause other liver toxicities in patients, which can be severe or life threatening. Doctors may order blood tests from time to

*FIG. 20*

KNOWLEDGE WEB

BACKGROUND OF THE INVENTION

1. Technical Field

The invention relates to knowledge. More particularly, the invention relates to a system for organizing knowledge in such a way that users can find it, learn from it, and add to it as needed.

2. Description of the Prior Art

There is widespread agreement that the amount of knowledge in the world is growing so fast that even experts have trouble keeping up. Today not even the most highly trained professionals—in areas as diverse as science, medicine, law, and engineering—can hope to have more than a general overview of what is known. They spend a large percentage of their time keeping up on the latest information, and often specialize in highly narrow sub-fields because they find it impossible to keep track of broader developments.

Education traditionally meant the acquisition of the knowledge people needed for their working lives. Today, however, a college education can only provide an overview of knowledge in a specialized area, and a set of skills for learning new things as the need arises. Professionals need new tools that allow them to access new knowledge as they need it.

The World Wide Web

In spite of this explosion of knowledge, mechanisms for distributing it have remained pretty much the same for centuries: personal communication, schools, journals, and books. The World Wide Web is the one major new element in the landscape. It has fundamentally changed how knowledge is shared, and has given us a hint of what is possible. Its most important attribute is that it is accessible—it has made it possible for people to not only learn from materials that have now been made available to them, but also to easily contribute to the knowledge of the world in their turn. As a result, the Web's chief feature now is people exuberantly sharing their knowledge.

The Web also affords a new form of communication. Those who grew up with hypertext, or have otherwise become accustomed to it, find the linear arrangement of textbooks and articles confining and inconvenient. In this respect, the Web is clearly better than conventional text.

The Web, however, is lacking in many respects.

It has no mechanism for the vetting of knowledge. There is a lot of information on the Web, but very little guidance as to what is useful or even correct.

There are no good mechanisms for organizing the knowledge in a manner that helps users find the right information for them at any time. Access to the (often inconsistent or incorrect) knowledge on the Web thus is often through search engines, which are all fundamentally based on key word or vocabulary techniques. The documents found by a search engine are likely to be irrelevant, redundant, and often just plain wrong.

The Web knows very little about the user (except maybe a credit card number). It has no model of how the user learns, or what he does and does not know—or, for that matter, what it does and does not know.

A Comparison of Knowledge Sources

There are several aspects to how learners obtain knowledge—they might look at how authoritative the source is, for example, or how recent the information is, or they might want the ability to ask the author a question or to post a comment. Those with knowledge to share might prefer a simple way to publish that knowledge, or they might seek out a well-known publisher to maintain their authority.

While books and journals offer the authority that comes with editors and reviewers, as well as the permanence of a durable product, the Web and newsgroups provide immediacy and currency, as well as the ability to publish without the bother of an editorial process. FIG. 1 is a summary of the affordances of various forms of publishing.

Corporate and Government Needs

For institutions, corporations, and governments, failure to keep track of knowledge has consequences that are quite different from those for an individual. Often, institutions make a bad decision due to lack of knowledge on the part of those at the right place and at the right time, even though someone else within the institution may actually hold the relevant knowledge.

Similarly, within a corporation, the process of filtering and abstracting knowledge as it moves through the hierarchy often leaves the decision-maker (whether the CEO, the design engineer, or the corporate lawyer) in a position of deciding without the benefit of the best information. The institutional problem is made worse by the problem of higher employee turnover in the more fluid job market, so that the traditional depository of knowledge—long-standing employees—is beginning to evaporate, just as the amount of knowledge that needs to be kept track of is exploding.

The consequences of not having the right knowledge at the right place and time can be very severe: doctors prescribing treatments that are sub-optimal, engineers designing products without the benefit of the latest technical ideas, business executives making incorrect strategic decisions, lawyers making decisions without knowledge of relevant precedents or laws, and scientists working diligently to rediscover things that are already known—all these carry tremendous costs to society.

The invention addresses the problem of providing a system that has a very large, e.g. multi-petabyte, database of knowledge to a very large number of diverse users, which include both human beings and automated processes. There are many aspects of this problem that are significant challenges. Managing a very large database is one of them. Connecting related data objects is another. Providing a mechanism for creating and retrieving metadata about a data object is a third.

In the past, various approaches have been used to solve different parts of this problem. The World Wide Web, for example, is an attempt to provide a very large database to a very large number of users. However, it fails to provide reliability or data security, and provides only a limited amount of metadata, and only in some cases. Large relational database systems tackle the problem of reliability and security very well, but are lacking in the ability to support diverse data and diverse users, as well as in metadata support.

The ideal system should permit the diverse databases that exist today to continue to function, while supporting the development of new data. It should permit a large, diverse set of users to access this data, and to annotate it and otherwise add to it through various types of metadata. Users should be able to obtain a view of the data that is complete, comprehensive, valid, and enhanced based on the metadata.

The system should support data integrity, redundancy, availability, scalability, ease of use, personalization, feedback, controlled access, and multiple data formats. The system must accommodate diverse data and diverse metadata, in addition to diverse user types. The access control system must be sufficiently flexible to give different users access to different portions of the database, with distributed management of the access control. Flexible administration must allow portions of the database to be maintained independently, and must allow for new features to added to the system as it grows.

It would be advantageous to provide a system to organize knowledge in such a way that users can find it, learn from it, and add to it as needed.

SUMMARY OF THE INVENTION

The presently preferred embodiment of the invention provides a system to organize knowledge in such a way that users can find it, learn from it, and add to it as needed.

The exemplary system has four components:
- a knowledge base,
- a learning model and an associated tutor,
- a set of user tools, and
- a backend system.

The invention also preferably comprises a set of application programming interfaces (APIs) that allow these components to work together, so that other people can create their own versions of each of the components.

In the knowledge web a community of people with knowledge to share put knowledge in a knowledge base using the user tools. The knowledge may be in the form of documents or other media, or it may be a descriptor of a book or other physical source.

A central feature of the knowledge web is that each piece of knowledge is associated with various types of meta-knowledge about what the knowledge is for, what form it is in, and so on. Conceptually, the knowledge base is a centralized resource with possible private compartments, much like the Internet. Also like the Internet, it is intended to be implemented in a distributed manner.

The knowledge in the knowledge base can be created specifically for the knowledge base, but it can also consist of information converted from other sources, such as scientific documents, books, journals, Webs pages, film, video, audio files, and course notes.

The initial knowledge within the knowledge base comprises existing curriculum materials, books and journals, and those explanatory pages that are already on the World Wide Web. These existing materials already contain enough examples, problems, illustrations, and even lesson plans to provide utility to an early incarnation of the knowledge web.

The knowledge base thus represents:
- Knowledge (online content or references to online or offline content), and
- Meta-knowledge, created at the time of entry, accumulating over time, and indicating, for example, the usefulness of the knowledge, reflecting user opinions of the knowledge, certifying the veracity of the knowledge, providing commentary on the knowledge, or indicating connections between the knowledge and other units of knowledge.

BRIEF DESCRIPTION OF THE DRAWINGS

FIG. 1 comprises a summary of the affordances of various forms of publishing.

FIG. 7 is an example of a set for generating a 128-bit identity.

FIG. 17 is a flow diagram showing a link display in which

Figure 19A:
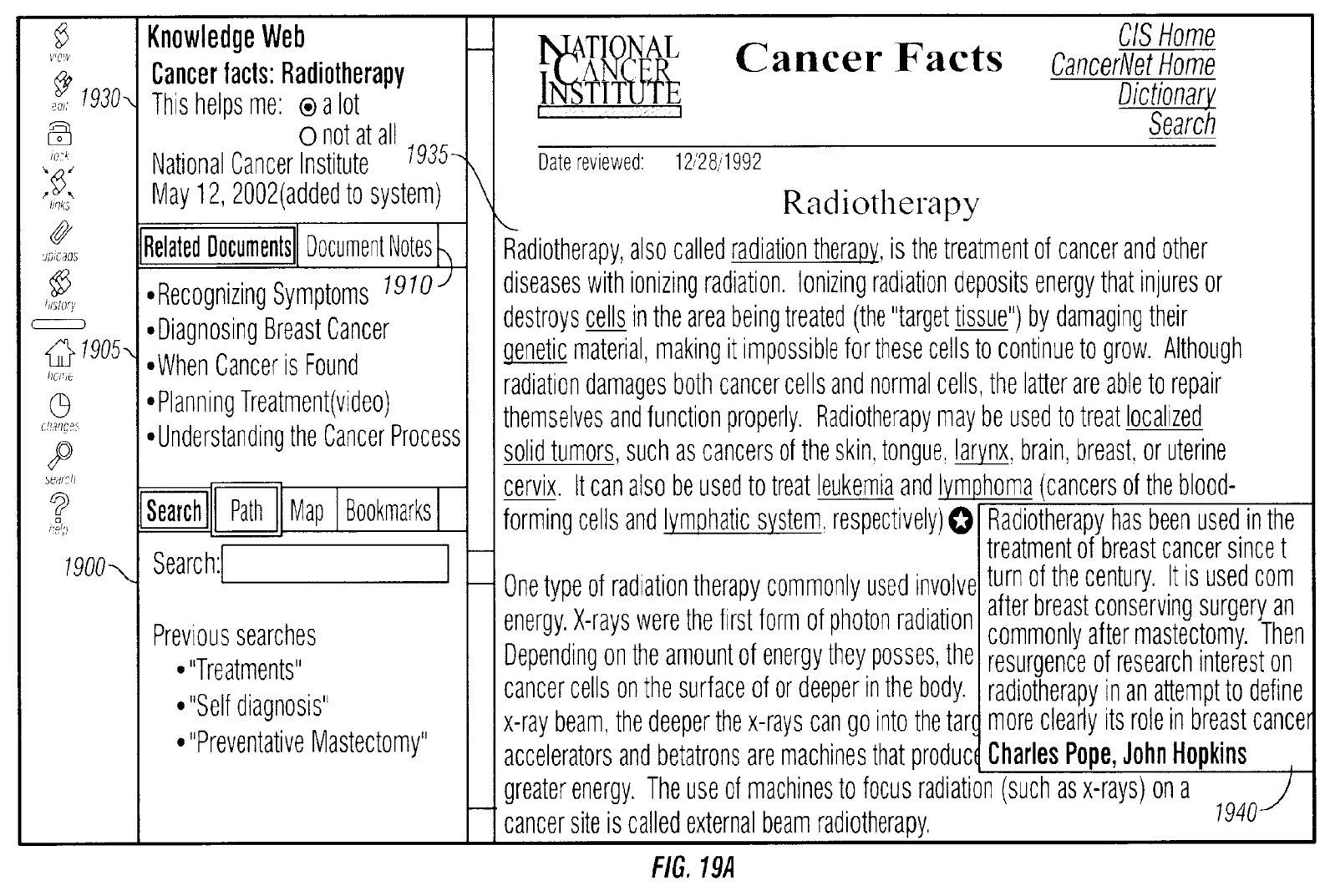

FIGS. 19a-19e are a schematic representation of a user interface according to the invention; and FIG. 20 is a schematic representation of a document fragment with comments according to the invention.

DETAILED DESCRIPTION OF THE INVENTION

While the invention herein is directed to solving various problems with regard to using, managing, and accessing information, three specific problems are identified in FIG. 2.

Figure 2A:
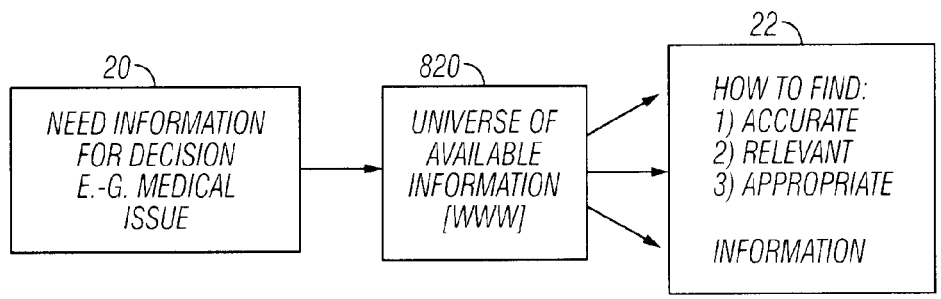
FIG. 2 comprises a series of block-schematic diagrams in which FIG. 2a outlines the problem of how to find accurate, relevant, and appropriate information.
FIG. 2b outlines the problem of how to sort and identify useful information.
FIG. 2c describes the problem of how to identify what information needs to be learned and what is the best presentation format for that information.

In FIG. 2a, a user needs information to make a decision 20, for example with regard to a medical condition. The user accesses the universe of available information 820 which, in this case, could be the World Wide Web or other sources of information. A process is required in this regard that would allow the user to find accurate, relevant, and appropriate information 22.

Figure 2B:
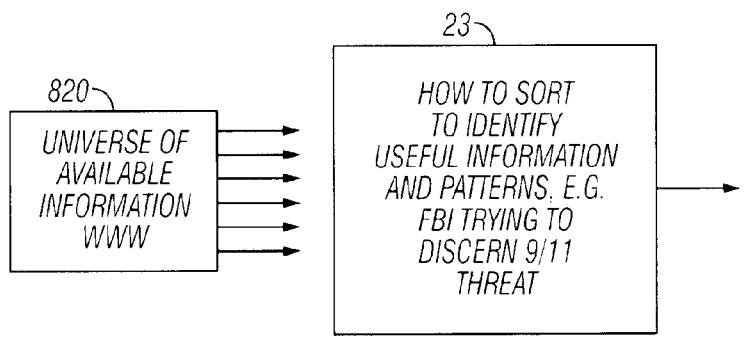

In FIG. 2b, the universe of available information 820 exists and a process is required for searching the information to identify patterns of information that are useful, for example, a government agency trying to identify a pattern of information that might predict a security threat 23.

Figure 2C:
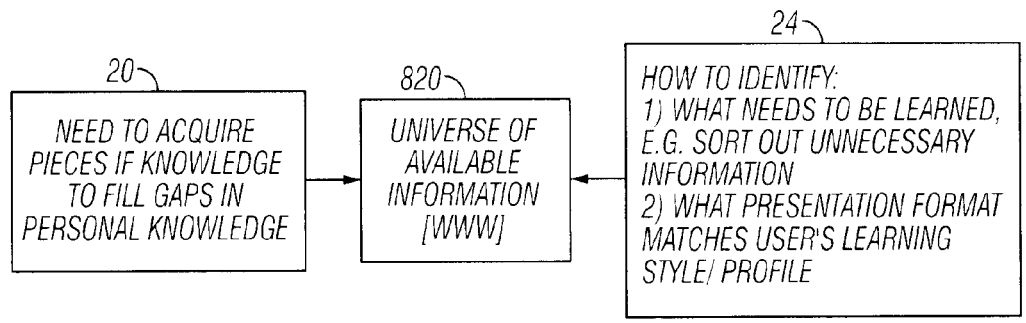

In FIG. 2c, a user 20 needs to acquire particular pieces of knowledge to fill gaps in the user's personal knowledge. When accessing the universe of available information 21, a process is required that allows the user to identify what needs to be learned and what information is extraneous and therefore need not be considered. The process must also present the information in a format that most closely matches the user's preferred learning style and/or intellectual interests 24.

The Knowledge Web—An Overview

Several of the key concepts underlying the knowledge web's approach to addressing the identified problems are detailed below.

A Broad Knowledge Base

A community of people with knowledge to share put knowledge into a knowledge base using a set of user tools. The knowledge may be in the form of documents or other media, or it may be a descriptor of a book or other physical source.

A central feature of the knowledge web is that each piece of knowledge is associated with various types of meta-knowledge about what the knowledge is for, what form it is in, and so on. Conceptually, the knowledge base is a centralized resource with possible private compartments, much like the Internet. Also like the Internet, it is intended to be implemented in a distributed manner.

The knowledge in the knowledge base may be created specifically for the knowledge base, but it may also consist of information converted from other sources, such as scientific documents, books, journals, Webs pages, film, video, audio files, and course notes. As Marshall McLuhan observed, "The content of the new medium is the old medium."

The initial knowledge within the knowledge web comprises existing curriculum materials, books and journals, and those explanatory pages that are already on the World Wide Web. These existing materials already contain enough examples, problems, illustrations, and even lesson plans to provide utility to an early incarnation of the knowledge web.

The knowledge base thus represents:

Knowledge (online content or references to online or offline content), and

Meta-knowledge, created at the time of entry, accumulating over time, and indicating, for example, the usefulness of the knowledge, reflecting user opinions of the knowledge, certifying the veracity of the knowledge, providing commentary on the knowledge, or indicating connections between the knowledge and other units of knowledge.

Collaboration and Community Involvement

One aspect of the knowledge web is peer-to-peer publishing. The task of recording and sharing the world's knowledge is so monumental that peer-to-peer publishing by a very large number of people is the preferred manner in which to accomplish it. One of the reasons why the Web and Internet news groups have enjoyed such runaway success is that they allow people to communicate with each other directly, without intermediaries. This basic human desire to share knowledge is also what drives the creation of the knowledge web.

Many people have specialized knowledge about certain topics, and know how to teach them especially well, but there are few easy ways for them to share that information effectively with a large audience, short of teaching a course, writing a textbook, or developing a television special. With the knowledge web's authoring tools, anyone with knowledge to share can publish short pieces, such as a single explanation of a concept—an effort comparable to creating a Web page. These explanations are the basic building blocks of the knowledge web.

While the knowledge web builds on systems such as the World Wide Web, Internet news groups, libraries, professional societies, books, and refereed journals, it allows an even more generalized form of linking than the World Wide Web. In the knowledge web, the author as well as readers can create annotations. These annotations can then be used for advanced features such as author credits, usage tracking, and commenting, that the Web lacks.

Users are also able to add annotations to explanations connecting them to other content, suggesting improvements, and rating their accuracy, usefulness, and appropriateness. Such feedback enhances the value of the knowledge web, keeps it current and useful, and eventually makes its way back to the original authors, so that they can use it to improve their explanations.

This ability of users to comment, filter, and review the content of the knowledge web solves one of the serious problems with peer-to-peer publishing—that of quality control. While publishers of textbooks and journals provide editing and selection services, the information on the World Wide Web is often irrelevant, badly presented, or just plain wrong (and that's not including the pornography and the propaganda). The knowledge web's peer review infrastructure also leads the way for third-party certification of content, further enhancing the knowledge.

Individualized Learning

The knowledge web allows for learning tailored to an individual learner. This is accomplished through the use of a tutor that customizes a user's learning experience based on a user learning model. The tutor handles the key problem of presenting the right information to the user at the right time. The knowledge web's tutor does not create or transform the knowledge itself, but merely maps a path from what a user already knows to what he needs to learn.

The learning model for an individual user combines a user profile, reflecting information on the current knowledge, needs, capabilities, and preferences of the user, with generalized knowledge about how people learn. The tutor draws upon the learning model and the meta-knowledge stored in the knowledge base to allow learning in a manner most fit for the user. In its simplest form, the tutor follows the explicit instructions of a human teacher on how to teach a certain body of knowledge to a certain type of person.

For example, the tutor may show that a given user has a firm understanding of calculus, a general understanding of Newtonian physics, and is completely mystified by quantum mechanics. The model may also include a much more detailed model of certain topics that are of particular importance to the user. For instance, in the case of a medical practitioner, it knows not only the physician's specialty, but it also knows with which recent discoveries, within that specialty, the physician is already familiar.

Most significantly, the user profile of a user is continually updated, allowing the tutor to become better acquainted with the user over time. It knows what the user already understands and what he is ready to learn. It knows the user's learning style whether he prefers pictures or stories, examples or abstractions.

EXAMPLE 1

A Lesson from Dr. Feynman

If a user wanted to learn about the principle in quantum mechanics called Bell's Inequality, he has several options. The user could read about it in any of several books on quantum mechanics. He could read the original paper describing it, or any of several papers that discuss it. The user could read articles on the Web that discuss Bell's Inequality. Which of these options is right? Are there other options to learning that he is unaware of? Is there a learning path he should take that would prepare him to understand Bell's Inequality? A personal tutor, if the user had one, might be able to help.

For example, there is a short film of Dr. Richard Feynman explaining Bell's inequality. Most people have little interest in quantum mechanics and no interest at all in understanding Bell's inequality, and would not understand or be interested in this film. On the other hand, most quantum physicists already understand Bell's inequality, and would learn little from Feynman's explanation.

However, if the user is a student who is just learning quantum mechanics, who has just mastered the necessary prerequisites, Feynman's explanation can be exciting, startling, and enlightening. It not only can explain something new but can also help the user make sense of what he has recently learned. The trick is showing the film clip at just the right time to the person who can best appreciate it. A good human tutor who understands the student's background and preferences can do just that.

The knowledge web's tutor seeks to emulate this personalized level of presentation. In its simplest form, the tutor is a knowledge base access tool that takes user preferences into account. In more complex versions it takes advantage of the meta-knowledge in the knowledge web and the user learning model to plan what information is presented and how.

The following is a list containing examples of methods that the tutor uses:

- The tutor plans its lessons by finding chains of explanations that connect the concepts the user needs to learn to what he already knows.
- The tutor creates a map of what the user needs to learn.
- The tutor chooses the explanatory paths that match the user's favorite style of learning, including enough side paths, interesting examples, multimedia documents, and related curiosities to match his level of interest.
- Whenever possible the tutor follows the paths laid down by great teachers.
- If an explanation does not work, and consistently raises a particular type of question, then the tutor records this information in the knowledge base, where it can be used in planning the paths of other students.
- Once the user has learned the material, the tutor updates the user profile to reflect the newly acquired knowledge. Because the tutor knows which subjects the user is and has been interested in, it can reinforce the user's learning by finding connections that tie these subjects together.
- The tutor becomes acquainted with the user because it has worked with the user for a long time.
- When an explanation does not work, the tutor tries another approach. The user can probe an area of learning further, request examples, and give the tutor explicit feedback on how it is doing. The tutor then uses all these forms of feedback to adjust the lesson, and in the process it learns more about the user.

EXAMPLE 2

The Physician's Dilemma

Imagine that the user is a physician who wants to treat a patient who has an unusual disease. A standard medical education probably treats the topic superficially, if at all. The user is thus faced with a few unsatisfactory alternatives. He might consult a specialist, but if he does not know much about the field it is difficult to know what kind of specialist is needed. The user could try reading a specialized textbook, but such a textbook is likely to be out of date, so he also has to find the relevant journals to read about recent developments. If he finds them, they almost certainly are written for specialists and are difficult for the user to read and understand. Given these unsatisfactory choices, the user may go ahead and try to treat the disease without the benefit of the best knowledge.

With the knowledge web, one can make the transition from a qualified general practitioner lacking specialized knowledge to a more fully informed specialist in several ways. The tutor might provide the best path for the user to gain knowledge about the condition and its treatment. It might put the user in touch with a nearby specialist. It might provide him with a forum to add his knowledge on this extremely rate condition for others to use.

Other Aspects

The knowledge web also provides features lacking or deficient in the World Wide Web, such as copyright protection, data security, permanence, and authentication.

The World Wide Web has demonstrated that many authors are willing to publish information without payment, but it does not give them any convenient option to do otherwise. The knowledge web provides various payment mechanisms, including subscription, pay per play, fee for certification, and usage-based royalties, while supporting and encouraging the production of free content.

The support infrastructure for payments allows different parts of the knowledge web to operate in different ways. For instance, public funding might pay for the creation of curriculum materials for elementary school teachers and students, but specialized technical training could be offered on a fee or subscription basis.

Another model that is supported is a micropayment system, in which a user pays a fixed subscription fee for access to a wide range of information. Usage statistics would serve as a means to allocate the income among the various authors. This system has the advantage of rewarding authors for usefulness without penalizing users for use. The ASCAP music royalty system is an example of how such a system might work.

Conclusion

With the knowledge web, humanity's accumulated store of information will become more accessible, more manageable, and more useful. Anyone who wants to learn is able to find the best and the most meaningful explanations of what he wants to know. Anyone with something to teach has a way to reach those who want to learn.

Knowledge Web Structure and Operation

As described in the preceding overview, the invention provides a system to organize knowledge in such a way that users can find it, learn from it, and add to it as needed.

The presently preferred embodiment of the invention achieves this goal with a system most simply considered as having four principal components:

a knowledge base,
a learning model and an associated tutor,
a set of user tools, and
a backend system.

The invention also preferably comprises a set of application programming interfaces (APIs) that allow these components to work together, so that other people can create their own versions of each of the components.

Knowledge Base

The knowledge base is composed of knowledge and meta-knowledge.

Knowledge

Each of the principal components of the presently preferred embodiment of the invention makes use of a knowledge representation scheme that organizes the knowledge within the knowledge base into explanations, topics, and paths. The explanation is the basic building block of knowledge in the system. An explanation is a human-readable piece of content such as text, audio, video, or interactive media. Explanations are organized into topics, and are connected by paths.

Explanations

Most of the information in the knowledge web is in the form of explanations. An explanation is a unit of content that helps the user understand one or more topics. An explanation may be a piece of text, an illustration, a segment of audio or video, or something more complex, such as an interactive Web page. Some explanations explain through instruction, while others give definitions, demonstrations, or examples. Explanations may be labeled with annotations providing meta-knowledge identifying their type, source, relevancy, etc.

A single explanation may explain several topics, and a single topic may be explained by many explanations. Every explanation has links to the topics that it explains. Explanations also have links to their prerequisites, that is, to the topics that represent the prerequisite knowledge. If a user needs a certain level of knowledge about a particular topic in order to understand an explanation, then the explanation has a link to that topic, indicating the level of knowledge required.

Topics

A topic is a cluster of concepts that a user might want to learn at the same time. The topic might be something very specific, e.g., "How to Change a Tire," or it might be something very broad, e.g., "Chemistry" or "Configuring UNIX Systems." An academic course is likely to cover a topic, but every item in the course outline is also a topic of its own. Topics typically have multiple subtopics included within them. A subtopic may be part of many topics.

The smallest type of topic is the testable unit of knowledge or TUK. The TUK is a very simple topic that contains no subtopics. It represents a single idea or a fact. It is so simple that the user either knows it or not. There are no degrees of understanding. A TUK is testable in the sense that it is possible to ask a question that tests whether the user knows it or not.

The knowledge web uses topics to organize knowledge. For example, a user of the system specifies what he wants to learn in terms of topics. Topics are also used to map an area of knowledge, to show the user a map of the gaps in his knowledge or a map of what is to be learned. The system also keeps track of what the user knows in terms of topics. It may know for example that the user is an expert at "Configuring UNIX Systems" and that the user is only a novice at "Chemistry." The system has a representation of how important each of the subtopics is to the topic, and which subtopics correspond to which degrees of understanding. It also has a representation of what parts of the topic the user knows.

Paths

A path is a way of describing a sequence of explanations and queries, with possible branch points. Paths are used to encode information about ways to learn a topic. As with an explanation, a path is linked to the topics it explains and topics it depends on as prerequisites. In fact, a path may be thought of as a kind of composite explanation. Some of the explanations in a path may be commentaries that guide a user along the path. For example, there may be a description of the topics to be covered in the path, or reviews of what has been learned. This type of commentary explains the path, not the content, so unlike a normal explanation it is not linked to a topic, but only to the path of the explanation.

A path can contain branch points that are based on answers to queries. These branches can ask the user for explicit directions, such as "Do you want to see another example?" or alternatively the branch may be a test of the user's understanding. A query always includes a set of sample answers. In the simplest case, these answers are presented to the user for a multiple-choice response. A query can also be set up so that the user gives a free-form response. In this case, the response is matched against the possible answers using a pattern-matching algorithm.

A path may also contain additional information about how the sequence is presented. For example, the path may constrain the timing of the presentation, or the layout of explanation and test questions on a page. This information is represented by annotations on the links of the path, described later.

Meta-Knowledge

The meta-knowledge within the knowledge base consists of user annotations and document metadata.

User Annotations

User annotations are associated with explanations, topics, paths, or other annotations and provide further information relevant to the explanation, topic, path, or annotation. Annotations do not modify the annotated content, but merely add to it.

The author of the annotated content creates some of the annotations; third parties create others. For example, the author of an explanation may add an annotation to link a list of frequently asked questions (FAQ's) or may support an associated discussion group. The author may also add annotations indicating that this explanation is only available to users with certain permissions.

Third parties add annotations, whether explicitly or implicitly, through their use of content. For example, usage statistics, a simple example of an annotation, are added automatically as users access content. Annotations are also added to reflect the popularity of content, or its appeal to learners of various types. In addition, certification authorities may add annotations certifying or questioning the correctness or the appropriateness of content.

Another type of statistical annotation that may be collected is a simple poll indicating whether a user liked the explanation. Feedback statistics may also be recorded for other usage information, such as how frequently specific questions are asked.

Third parties can also make annotations explicitly. For instance, a user can add an annotation designating a related explanation, or an annotation offering editorial comment.

Document Metadata

Several annotations to an explanation, topic, path, or annotation may be added automatically at the time of creation, such as those identifying the creation date, authorship, or language. This form of annotation is referred to as document metadata.

As used herein, the act of annotation refers generally to the creation of meta-knowledge, encompassing both user annotations and document metadata. Similarly, annotations refers generally to instances of both user annotations and document metadata.

Learning Model and Tutor

The tutor makes use of the learning model and the knowledge base to help the user find the topics and explanations that are most helpful. For example, the tutor uses an awareness of the user's age, language preferences, and reading level to filter and sort explanations. It also uses information on which authorities the user trusts, and which authors he likes. This information is also used to filter and sort explanations.

The tutor also knows about specific topics that the user learned or demonstrated knowledge of in the past. It has information about the user's interests, both in terms of topics and presentation. It knows the user's preferences for words, pictures, audio, video, or interactive programs. It also knows whether the user likes examples, definitions, equations, diagrams or stories. It may even know whether he likes to stay focused or wander, whether he prefers to explore wide or drill deep. All this formation helps the tutor present information in a way that the user can most easily understand it. Preferably, all user specific data is private and inaccessible to others.

In some cases the user may not be looking so much for a specific piece of knowledge, but for a credential or a skill. The tutor is also able to help the user find these. For example, there may be a topic corresponding to "Passing the New York State Bar Exam" or "Operating a Caterpillar Model D3 Bulldozer." These topics not only link to the knowledge the user needs to pass the test, but also to course that lead to certification. In many cases, learning the factual knowledge is only part of the process.

Once the user has chosen what to learn, the tutor helps the user choose how to learn it. In the simplest cases, this may be a single explanation. In more complex cases, the tutor finds chains of explanations that connect what the user wants to know to what is already known. The tutor takes into account the user's personal tastes, language, sensibilities, and learning style in its choice of content. It also takes into account the statistical experience of others. It knows what explanations have worked in the past, and it also finds and takes advantage of paths and annotations laid down by teachers.

As with choosing the topic, choosing explanations is an interactive process between the user and the tutor. In the simplest cases, the user can just choose from a list of sorted options. In more complex cases, the process is more like planning a course of study. For instance, the user may want to plan which material is covered, how long the user is willing to spend, and in what sequence the user wants to learn things. This gives the user an outline of the plan of study.

The tutor can also test the user's knowledge by asking the user questions. How often it does this depends on the user's personal preferences. Such questions are partly to reinforce what the user has learned and partly to verify that the user has learned it. If the user has not learned a concept, the tutor may suggest other explanations. If the user is following a path created by a teacher, the teacher may have included a question, and suggestions on where to go next that depends on the user's answers. The teacher can use wrong answers to steer the user down a branch of the path that helps the user clear up a particular misunderstanding.

The tutor acts as a guide, not as a director. Its job is to present the user with the options, and recommend those that come closest to fitting the user's needs. It is also the tutor's job to keep the user informed about where the user is, and where the user might want to go next.

User Tools

The knowledge web provides two principal sets of user tools to access and modify the knowledge base—viewing tools and authoring tools. The viewing tools provide the user access to and a limited ability to modify the knowledge base, whereas the authoring tools allow for more rapid and more extensive creation and modification of content.

Preferably, these tools are implemented as software systems.

Viewing Tools

The viewing tools provide the primary interface between the user and the knowledge web. The viewing tools can be thought of as an extended Web browser, with support for specialized operations for the knowledge web. The presently preferred implementation of the viewing tools is a browser with an added set of extensions. The viewing tools supports three basic activities: knowledge base visualization, content display, and annotation. The viewing tools provide specialized user interfaces for each of these three activities.

Visualization Interface

One goal of this aspect of the invention is to develop a better way for a user to visualize and navigate a connected web of knowledge. This aspect of the invention allows the user to navigate through the links, see patterns in the connections, and reorganize the information according to multiple navigational schemes. It allows the user to see detailed local information, and also see how that information fits into a broader global context.

Visualization of the knowledge base typically begins with the selection of a topic or topics that a user wants to learn about. In the simplest cases, this can be accomplished by the user naming a topic. This may be done by the user entering a word or phrase into a topic-search engine.

The visualization interface then displays a map of the area of topic space the user selects, showing what the user already knows and what is knowable. On the topic map, the space of topics and subtopics is illustrated as a two-dimensional landscape, with borders, landmarks, and links showing relationships between topics. A coloring scheme shows the user's prior knowledge and the relative importance of the topic.

As described herein, the tutor can play an important role in generating a map that is meaningful to the user. Because the learning model provides the tutor with an understanding of what the user already knows and how he prefers to have information presented, the visualization interface is able to create a map specifically for the user.

The visualization interface allows the user to display and navigate the topic map. The way that the map is drawn and colored in context depends both on what the user is trying to learn and on what others the user trusts have judged to be important. The map allows the user to get a feel for the size of each topic, and how long it takes the user to cover. It also shows paths that the user has traveled before and paths that others have traveled before. The visualization interface allows the user to move through the topic space by panning, zooming, or leaping from topic to related topic. The user can zoom into the relevant topics, look at their subtopics and mark the things that are of interest, or that are already known.

The system may also provide a simulation of a three-dimensional navigational space that the user can "fly" through, by moving forward/back, right/left, or up/down, or rotating. It is anticipated that the user will not be permitted to use the rotation function, as it would likely result in disorientation of the user. In this navigation space there are a number of graphical objects: some are three-dimensional, and some are animated. Some of the objects have sounds associated with them that the user begin to hear as he draws near. Between objects are links, representing the relationships between the concepts they represent. The links are initially nearly transparent, but as the user moves nearer an object, the links associated with it become more visible, then fade as the chain of connections extends away from the object. As the user approaches a link, links of that type become more visible.

The objects are arranged in space in a systematic way. For instance, the vertical dimension may represent historical time, and the horizontal dimension may represent a theme. The organization scheme is not fixed. When the scheme is changed, the objects reorganize themselves in a new order.

The user moves through this space to find and examine objects of interest, to visualize their relationships, and to visualize the context into which they fit. The space is rich in color, depth, texture, motion, and sound; rich in a way that adds meaning and helps understanding.

The visualization interface uses the spatial metaphor at all levels of the topic tree. At the higher level the map has been carefully drawn by human mapmakers. Topics such as "Chemistry" and "Physics" maintain a dependable relationship to one another in the landscape. This allows the user to get to know an area of the topic landscape, and learn to navigate through it. At the high level, the topic map changes slowly. At the lower, more detailed levels, the topics such as "Internet addressing schemes" and "Current Events" are more dynamic, and the topic map begins to look more like a web of connections.

Display Interface

Once the user has decided what he wants to learn, the display interface presents the information, as directed by the tutor. The display interface presents explanations to the user as a sequence of presentations, much like a linked sequence of Web pages. The display interface supports most of the familiar Web browsing functions, such as forward and back (a.k.a. next and previous) and hypertext links. It also supports the same range of media types as a conventional Web browser, including text, images, audio video, and various forms of interactivity. In fact, the display interface can also function as a Web browser, and it does so when a link takes the user to pages on the World Wide Web.

Within the knowledge web, the display interface can provide better navigation than a Web browser. For instance, it has a "Where-am-I" button that, preferably in conjunction with the visualization interface, orients the user within the path or the topic space, and a "Return-to-Path" button that can bring a sidetracked user back to the main path.

The display interface supports still other functions that cannot be supported on an ordinary Web browser because of the limitations of the World Wide Web. One of the most important is the "About this" button. For any item in the knowledge web, it shows the user who the author is, when it was written, who has certified it for what purposes, how often it has been used, etc. It also shows the annotations, made by the author or third parties, indicating related material, references, associated discussion groups and user feedback. Again this material is sorted and filtered according to the user's personal preferences.

The display interface can also take advantage of annotation to provide more meaningful interaction with the user. For example there are buttons for the functions "Show me a picture," "Give me an example," or "Give me a different explanation." The user can also ask for the definition of a word, in which case the display interface shows the user the definition that makes sense in the context of the particular topic at hand. The display interface also supports the ability to ask a question. Questions are matched against the list of frequently asked questions (FAQ's) associated with the explanation, and also against more general FAQ lists associated with the topics. The question can also be forwarded to the author of the content or posted on a discussion group.

Annotation Interface

The annotation interface allows the user to modify the knowledge base through the addition of annotations.

The process of viewing content in the display interface causes some annotations, such as user statistics, to be updated automatically. Alternatively, a simple poll indicating whether a user liked an explanation may be conducted. This polling feedback may be generated by a voting scheme, using a simple pair of "thumbs up/thumbs down" in the annotation interface. Voting may be made anonymous by an encryption scheme that hides the identity of the user, while guaranteeing that a user can vote only once. Feedback statistics may also be recorded on other usage information, such as how frequently specific questions are asked.

Users can also make annotations explicitly. For instance, a user can add a link to a related explanation or Web page. A link of this type contains descriptive information about how it is related. An annotation of this type must have an author who takes responsibility for it. Only the author of an annotation of this type can modify or delete it.

Authoring Tool

While the viewing tools can be used to add annotations to existing content, most new content is created using the authoring tool. The authoring tool can be used to convert an existing document, such as a textbook, article, or Web page, into an explanation for the knowledge web. It can also be used to create an instructional path with branches, quizzes, commentary, etc.

Creating an Explanation

A knowledge web explanation is distinguished from ordinary Web content by annotation and registration. Registration means that the page has been declared to exist as part of the knowledge web. This is accomplished by submitting it to a registration server. Before content can be registered, specific annotations may be required and various options specified. For an explanation, the required annotations include the author, creation date, URL identifying where it is stored, a list of the topics the explanation explains, and information specifying language and media type.

To aid in the process of registration, the authoring tool provides a mechanism for helping to find the topics corresponding to an explanation. The author specifies a topic to which an explanation applies using the topic chooser. The authoring tool then presents the author with a list of specific topics, sorted according to how well they match the explanation. It may also present the author with a menu of subtopics that more exactly match the explanation. The author may choose one or more of the subtopics, and even narrow down the range to specific testable units of knowledge that are explained. Once the list becomes manageable the author can check off the appropriate topics. The author may also create new topics, as described below.

There are also a number of annotations that may be specified at the time of registration. For example, the author may wish to restrict access to the information to users who have been cleared through a specified permissions authority. The author may want to support an associated discussion group, or may want to be an informer of questions that are asked by users. The author may link search keywords for locating the explanation or identify it as being relevant to certain topics. An author may also link an explanation as having content inappropriate to children. The authoring tool also provides an easy way for the author to link frequently asked questions and associated answers.

The authoring tool registers the explanation by transmitting registration information to the registration server, and storing the content and annotations in a suitable location within the knowledge base. At the time of registration, the author may also choose to submit this explanation to various certification authorities for consideration. The authoring tool provides support for such submissions.

Creating a Topic

Normally the author of an explanation tries to link explanations to existing topics. For those instances when this is not possible, a new topic may be created. The authoring tool includes an interface for visualizing the knowledge base, preferably similar to that in the viewing tools, with a search engine and topic browser. To create a new topic, the author specifies its relation to one or more existing topics. The author specifies any subtopics within the topic and preferably identifies what knowledge is required for several levels of mastery, such as familiarity, understanding, and expertise. A short definition of the topic must also be specified, and optional search terms may also be included.

Creation of testable units of knowledge (TUKs) is even simpler because TUKs are topics with no subtopics, and only one level of understanding. A TUK can often be stated in a single sentence. Creating a TUK can be as simple as highlighting a single sentence in the explanation, or the clicking of a button. When a TUK is created, the authoring tool tries to parse the sentence and creates a diagnostic test question. This suggested question can be accepted or rejected by the author.

Once a topic is registered, it is included immediately in the topic database. Later, it may be merged with another topic. At any time, authorized individuals are able to edit the topic tree and collapse several topics into a single topic, or to split existing topics. The same rules apply to TUKs.

When converting an existing document into a series of explanations of the knowledge web, the outline of the document often corresponds closely with the list of topics that are covered. This is particularly true of a textbook or a technical manual. The authoring tool includes a mechanism for mapping an existing outline onto a topic tree. It helps the author find existing topics that correspond to the outline items, and existing TUKs that correspond to the explanation. It also helps the author create any TUKs and topics that do not already exist. Because it is working within the context of a hierarchy, broad topics identified at the top of the hierarchy can help inform the search process for the more specific topics below.

Creating a Path

Just as explanations encode knowledge, paths encode information about how to learn that knowledge. A teacher, for instance, can create a path to guide a student by specifying a sequence of explanations, which may include documents, queries, and commentaries. The authoring tool helps the teacher specify each explanation in the path. It also allows branches to be added based on queries. A different branch of the path may be linked to each answer of the query. In addition the tool gives the teacher control over how the information is presented on pages. As an aid to the author, the authoring tool automatically produces a flow chart of the path, showing all links and branched and list of TUKs and topics that are explained and a list of prerequisites.

The authoring tool provides a simple way to create a query, as a branch point in a path. The required information for a query is similar to an explanation. The same tool is used to create any query, whether it is a test question, or a question to determine the branch of a path. In addition the query must have a set of possible answers, one of which is specified as correct. The query may be tagged as a multiple-choice question, in which case the answers are presented to the user in randomized order as choices. If the question is not a multiple choice, a pattern matcher is used to pick one or more of the answers to be verified by the user. In this case, matching patterns may be explicitly associated with each of the answers. If such patterns are not specified, the answers themselves are used as patterns.

Once the path has been created, the authoring tool can be used to register it.

Backend System

Generally, the backend system supports access to the structured knowledge within the knowledge base. The detailed architecture of the backend system is a central feature of the present invention, and is accordingly described below in greater detail.

Backend System Architecture

The backend system addresses the problem of how a very large amount of loosely structured data can be stored, organized, and shared among a large and diverse group of users. To better illustrate the backend system of the present invention, the system is described in detail with respect to the presently preferred embodiment of the invention, which provides a distributed, scalable architecture that implements a database using standard commercially available components.

In this embodiment of the invention, the knowledge base is viewed as a database represented as a labeled graph that can be accessed and modified by thousands of users concurrently. In this approach, the knowledge within the knowledge base is viewed as data, and the meta-knowledge within the knowledge base is viewed as metadata. Entities of content, for example explanations, topics, paths, and links, are viewed as data objects. In the labeled graph view of the database, the nodes of the graph represent data objects, and the associated metadata are represented by links connecting those nodes. Finally, the various user tools provide a front end to the database.

The data is stored on one or more data servers, and information about the data is maintained by one or more data registries. The servers and registries are preferably implemented as a distributed application that runs on servers connected by a network. Herein, the backend system is described in terms of a single data registry and a large number of data servers. Each of these servers may actually be implemented as a distributed application that caches information across multiple machines, but this aspect of the implementation is ignored for purposes of this discussion.

Users may access the database through a network using the front ends. The front ends talk to a metaweb server which has access to the user's security profile, and access to the registry. With this information, the metaweb server obtains the location of the data objects requested by the user, retrieves them from data servers, and assembles them for manipulation by the front end.

Data Objects

All data and metadata in the system are represented as nodes and links, which may be classified into the following types of data objects.

Data Nodes

The system supports data generally in multiple formats and in multiple data types. Examples of data types include text, image, sound, video, and structure data. Also, the system supports the storage of data in multiple locations, both online and offline, and provides identification information for the data, including location, data type, and data format, and other attributes as available.

In the case of online data, support is provided for storing redundant copies of data at multiple online locations. In the case of offline data, robust identifiers such as an ISBN number, a Library of Congress classification, or document citation are provided wherever possible to enable the user to negotiate access to the element in some way.

Concept Nodes

Concept nodes are internal objects that are used to group or otherwise classify data objects. Examples of concept nodes include nodes representing categories, entities, and classes of data. Concept nodes are treated similarly to data objects in that links may originate or terminate in them. Users are able to search or navigate the database using concept nodes.

Labeled Links

The system supports labeled links of many different types. The types of links are centrally managed and limited to a known number of specific types. Examples of types of labeled links include links representing membership in categories, links associating data with specific objects, links tagging document metadata, and links representing user annotations. Provision is made for addition of labeled link types based on user needs and system growth.

Links are directional. Given a data object it is always possible to determine all links that connect from the data object to another data object. Finding all links that connect to the data object may require search. Links may connect from data nodes or concept nodes to data nodes, concept nodes to numbers or to text strings.

Labeled Graph

The relationships between the data objects may be represented by a labeled graph.

Figure 3:
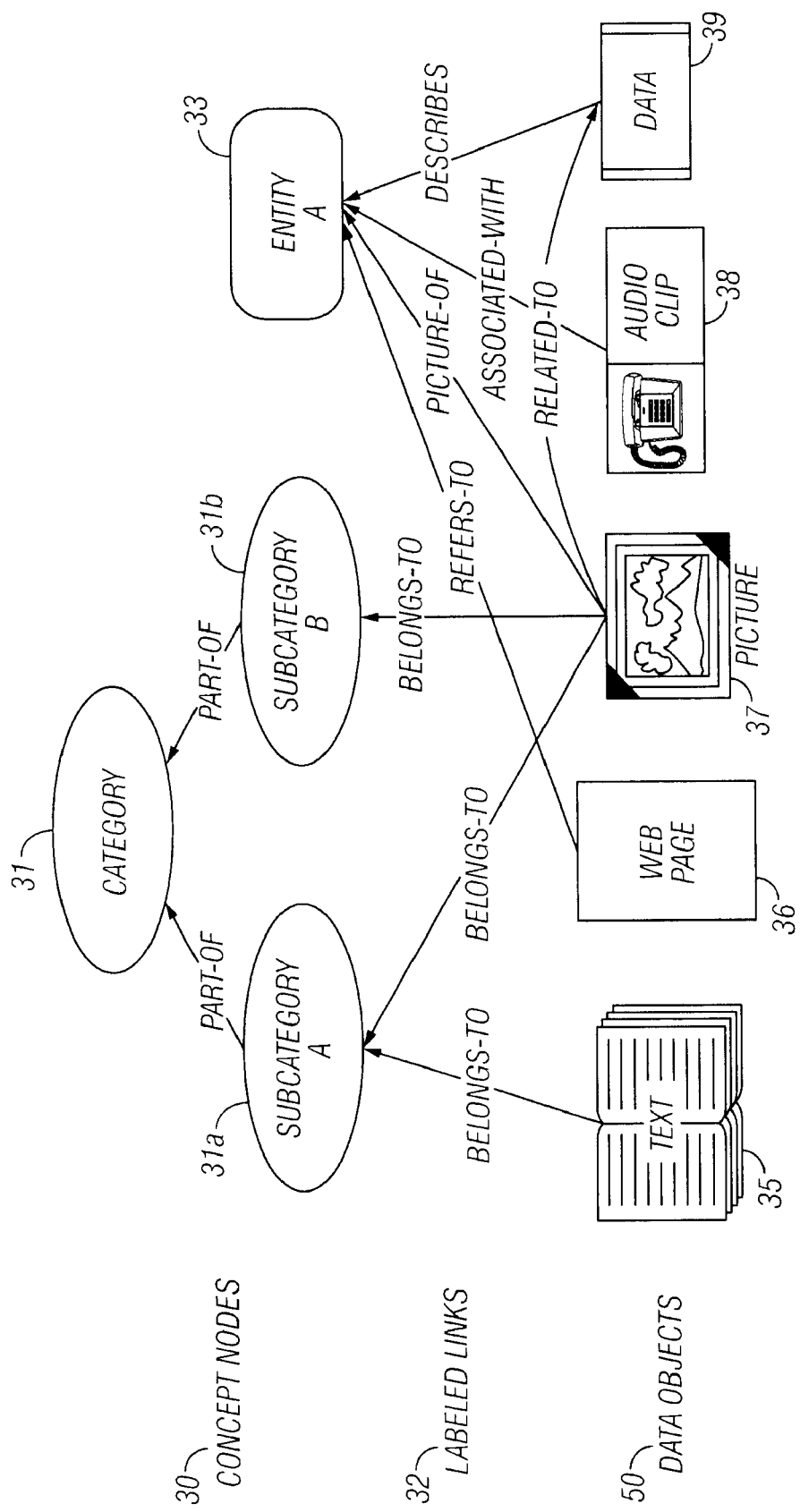
FIG. 3 is a block schematic diagram which shows the organization of information in accordance with the invention.

FIG. 3 shows a database represented as a labeled graph, where data objects 50 are connected by labeled links 32 to each other and to concept nodes 30. For example, a concept node for a particular category 31, contains two subcategories 31*a*, 31*b* that are linked via labeled links "belongs-to" and "related-to" with text 35 and picture 37. An entity 33 comprises another concept that is linked via labeled links "refers-to," "picture-of," "associated-with," and "describes" with Web page 36, picture 37, audio clip 38, and data 39.

System Components

Figure 4:
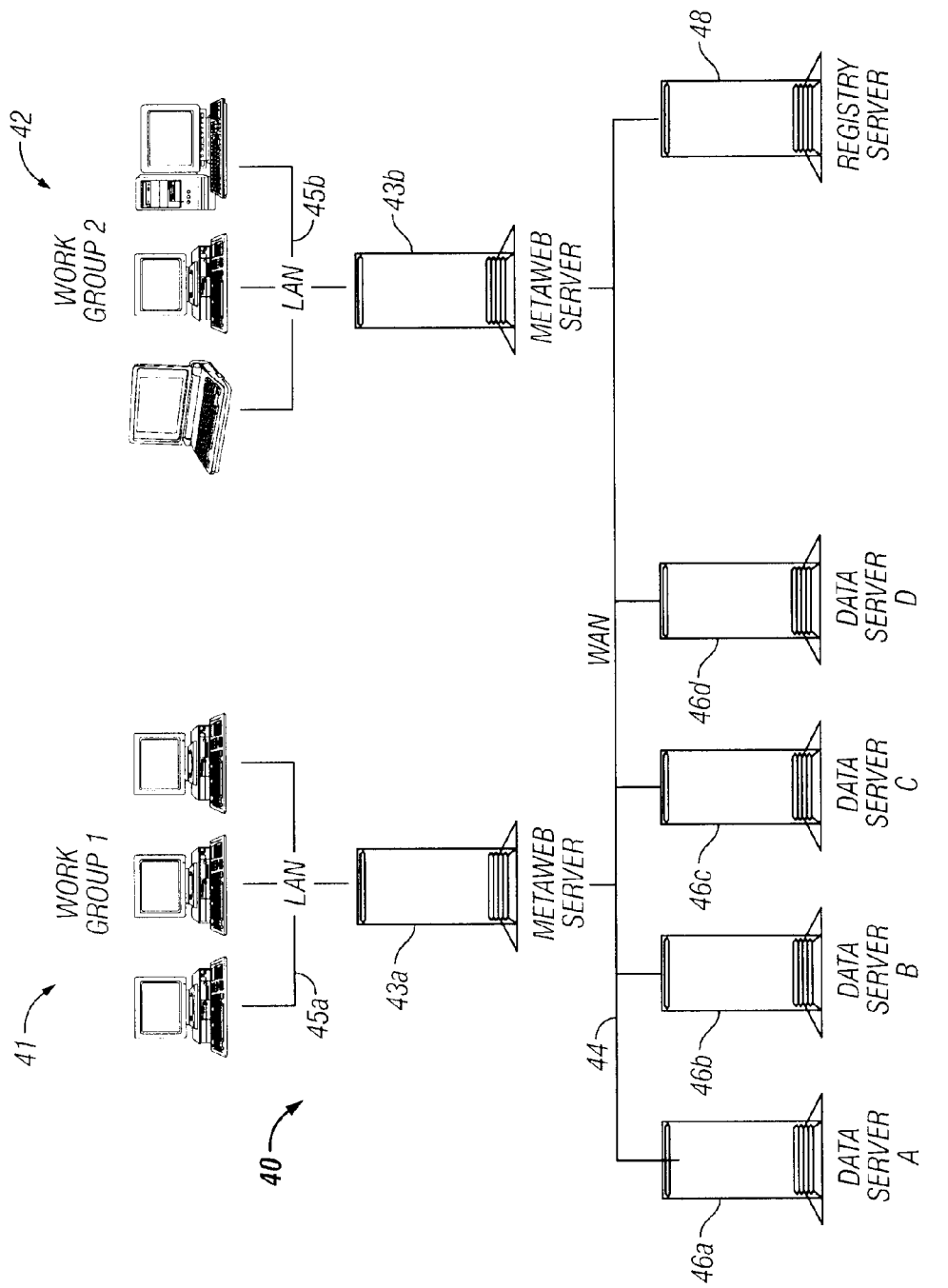
FIG. 4 is a block schematic diagram which shows a system configuration according to the invention.

FIG. 4 shows a sample configuration containing several principal components of the system. These components may be generalized or implemented in various forms and configurations.

Front Ends

Users access the system through a network via applications, for example on workstations or PCs. These components are external to the system itself, although the system provides APIs that enable software running on these workstations to communicate with the system.

Registry

Each object in the system is registered in a registry. The registry keeps track of where the data and metadata associated with a data object are stored. Every data object has a unique signature and index, which is used to access the data object within the registry. Using the index, the system locates the data object in the registry and assembles components of the data, metadata, and other information from various data servers across the network.

Servers

FIG. 4 shows a number of front ends, for example in workgroups 41, 42, and data servers, 46*a-d*, interacting through a network 44, such as the Internet. Human users access the system through a front end application that accesses one of many metaweb servers 43*a*, 43*b* on the network. These metaweb servers then access the registry through local caches, updated from one or more registry servers 48. The information in the registry is then used to identify data servers 46*a*-46*d*, which are accessed to obtain the data.

As shown in the figure, there are several types of servers provided in the backend system.

Metaweb Servers

Metaweb servers provide access to the system through APIs that may be used either by automated processes, or by front-end applications that are in turn used by humans. These servers access the contents of the registry and then obtain data from data servers to fulfill user requests.

Data Servers

A potentially very large number of data servers store the underlying data and metadata. The system supports implementations where this data is multiply redundant on several servers to ensure availability. Data servers operate independently and can be administered independently. They provide data access via standard protocols such as HTTPS, NFS, and SQL queries.

Registry Servers

The registry is stored in a number of registry servers, and is also cached by metaweb servers as required. Information about data, its components, associated metadata, and all related links is stored in a registry. As with the data servers, the registry may be distributed across a number of servers, for redundancy and for performance. Multiple registry servers can work together to form a distributed hierarchical cache of the directory, using a scheme similar to the Domain Name Server system of the Internet.

The registry servers may facilitate the maintenance of various different registries.

Pen name registry. An author must register content under a pen name, and this pen name must itself be registered with the registration server. A pen name may be a real name or an alias. Pen names are unique identifiers; the registration server does not register the same pen name to two different people. A pen name may be registered anonymously, that is without supplying a real name, in which case it is identified as such. A single author may have more than one pen name. Each pen name has an associated password, which is used to verify the identity of the author.

Content registry. The content registry keeps a record of all the content on the knowledge web, including explanations, paths, and annotations. The registry keeps track of where information is, the author's pen name, and when the information was registered. The content registry also keeps track of some specific attributes including the topics linked to explanations, the usage and voting statistics associated with content. When an author registers content, he must affirm that he either owns the content, or has the right to publish it in the knowledge web. If there are access restrictions on content, the registration can specify a permission server that is empowered to negotiate access. The content registry not only registers content but it also provides access to the registration information. All content registration information is publicly available. The content registry is not responsible for vetting the content that is registered, it only keeps track of its existence.

Topic registry. The topic registry keeps track of all topics, including TUKs. Unlike the content registry, the topic registry attempts to impose some order on the arrangement of topics, and for this reason it may be desirable to have multiple and competing topic registries. The central editorial problem of the topic registry is to keep the topic tree well organized and to keep the number of topics manageable. The topic registry registers any topic that meets certain minimal standards, but it may later decide to merge it with a similar topic. After such a merger, all links to either of the component topics are interpreted as linked to the merged topic.

Storage Domains

The system stores data and metadata in one or more storage domains connected to the system. These storage domains are typically disk based files systems representing a specific database. The system allows the data and metadata associated with an object to be stored as multiple components in multiple storage domains.

The system also allows data and metadata components to be stored redundantly, either within a single storage domain, or across multiple storage domains.

Access permissions are controlled by user and by storage domain. Each user has a set of access privileges associated with each storage domain. The system administrator of the storage controls which users are granted which privileges. Specific privileges may be granted to allow a uses read, add, modify, search, or delete data within that domain. A user may also have a privilege that allows a user to be ware that data exists with a storage domain, without necessarily being able to access that data.

Security

All user requests are subject to the user having the right authorization for the request. There are two places where this authorization is managed—the user's profile and the data server's rules. When the user logs on to the metaweb server, the user's profile is accessed, and security and data access authorization information that is specific to that user is retrieved. Subsequently, when the user makes a data request, the metaweb server uses the authorization information to process it. In addition, access rules are also defined at the data server to specify the kind of users that have access to read or update the data on that server.

Services and Applications Program Interfaces

Accessing Data

A user interacts with the system through a user interface application. A set of Applications Program Interfaces (APIs) describes protocols for accessing and modifying the database. Automated processes also interact with the system through this set of APIs. The actual preparation of such APIs is considered to be within the skill of those skilled in the art and, accordingly, they are not discussed in detail in this document.

The objects potentially accessible to users include data nodes, labeled links, and concept nodes. Which objects are actually accessible to a particular user depends upon the user access privileges to the storage domains that hold the data associated with the object.

When a user requests a node, the system fetches and assembles all data and metadata components associated with the node that are accessible to the user. This includes all objects linked from that node that are accessible to the user.

Adding Data Objects

The API allows authorized users to add data objects, concepts nodes and links to the system, specifying the storage locations of the related data and metadata.

Updating Objects

The API allows authorized users to update objects in the system by changing or adding metadata associated with that object. The data associated with a data node are not allowed to change. All updates to data create a new data object because the unique index is modified. The original data object is flagged as updated, with a link pointing to the new version.

Updates to certain objects triggers an administrative process to provide for archival and verification services.

The system provides metadata tags that are placed on objects, specifying those users that are to be notified whenever that object is updated. The system provides the notifications to users specified by those tags.

Deleting Objects

The API allows authorized users delete objects from the system by labeling them as deleted. The system allows the system administrator to establish policies for the actual deletion of objects that are so labeled.

Requesting Notification

Authorized users can request notification if a data object they are interested in is changed, deleted, or has metadata added to it. This is done by connecting a user change-notification link from the data object to the concept node representing the user.

Searching

The API allows search engines and automatic indexers to match objects with particular characteristics. These search engines are applications that use the system, but that are not built into the system architecture.

Authentication

The system provides a mechanism for notifying the user if the data associated with an accessed data node have changed since the object was created.

Access Hiding in the Metaweb Server

When accessing open-source material there is a potential security problem with repeated accesses to open data, in that the pattern of accesses from a single source may itself attract unwanted attention. The system supports two mechanisms for mitigating this problem.

The first mechanism is the data caching mechanism, which can prevent multiple remote accesses to the data. The system is capable of keeping a cached copy of all documents examined, so that they do not need to be retrieved a second time for reexamination. The second method for hiding patterns of access is indirection through an anonymous relay. The system allows multiple access to the same data server to be masked by indirectly accessing the site through anonymous relays. Such techniques as data caching and anonymous relays are well known in the art and are not discussed herein.

Administrative Functions

Users. The system allows the system administrator to add new users to the system. Users are represented as concept nodes within the system with associated metadata represented as labeled links. These metadata include information about user access privileges, and information (such as an email address) about how to send notification to that user. Normally this information is stored within a storage domain only accusable to a system administrator.

Storage Domains. The system allows the system administrator to add new storage domains to the system and to specify an administrator for such storage domains.

Data Formats. The system allows the system administrator to add new data types, link types, and data storage formats to the system.

Auditing Functions. The system architecture allows auditing functions to be provided within storage domains. The architecture allows, but does not include, auditing functions to monitor a user's or system administrator's patterns of activity within each within storage domain.

The Registry

Because the registry and the methods used to maintain the registry are a central feature of the invention, they are described in detail with reference to the presently preferred embodiment.

The registry is a distributed hierarchical directory of information describing nodes and links of the labeled graph. The registry maintains information about the location of each data object's representation and the representation of its associated metadata. In other words, the registry makes the connection between the elements of the graph and the bits that represent them. The registry keeps track of where the data that represents each object are stored. The registry is stored on one or more registry servers and part of it can also be cached by one or more metaweb servers.

The Registry and Index Hash

Figure 5A:
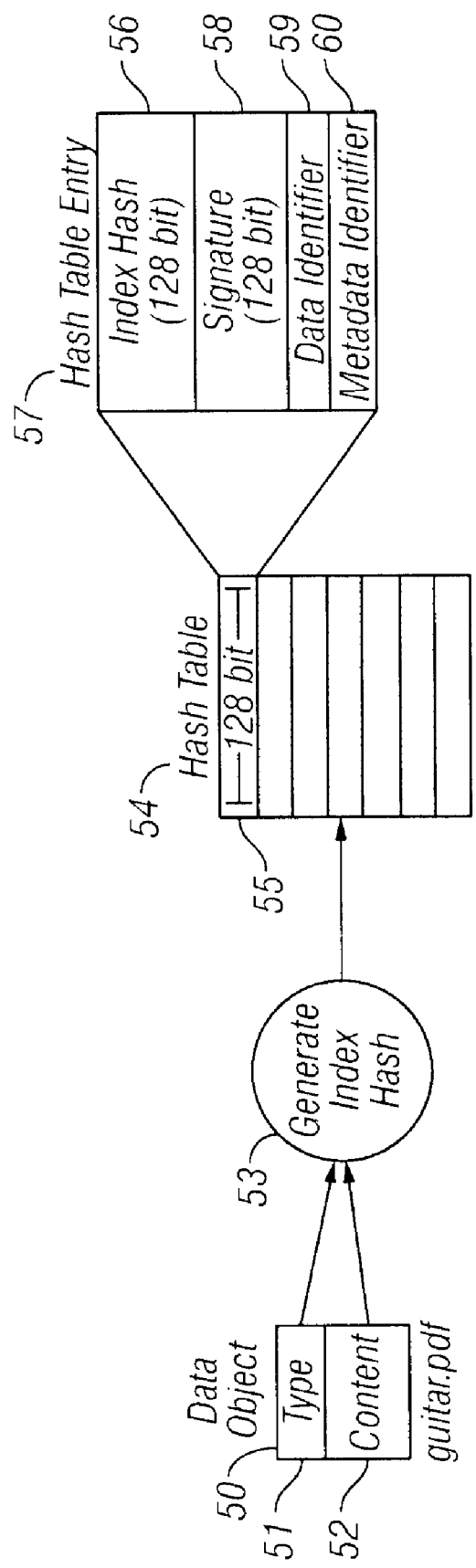
FIG. 5a is a flow diagram showing the data object registry process according to the invention.

FIG. 5a is a block schematic diagram that shows the data object registry process. When a data object 50 is registered in the system, its type 51 and content 52 are used to generate 53 a fast, unique hash value, which is used as the aforementioned index hash 56 into the registry. This hash value is used to identify and register the data object 50 into the registry and is used as the index hash 56 in the registry's hash table 57. In the preferred embodiment, the index hash 56 is chosen from a 128-bit 55 address space, and is assumed to be unique for each object. If the same object is encountered twice, then both instances generate the same hash index. Thus, identical objects of identical types are always treated by the system as a single object.

Data Object Representation

FIG. 5a is a block schematic diagram that shows the data object registry process. Each registered data object 50 is represented as a hash table 54 entry 57. Hash table entries 57 identify a data object's 50 location, representation, and any associated information annotating the data. Specifically, each hash table entry 57 contains an index hash 56, an optional cryptographically strong signature 58 for verification and security, a data identifier 59, and a metadata identifier 60.

Figure 5B:
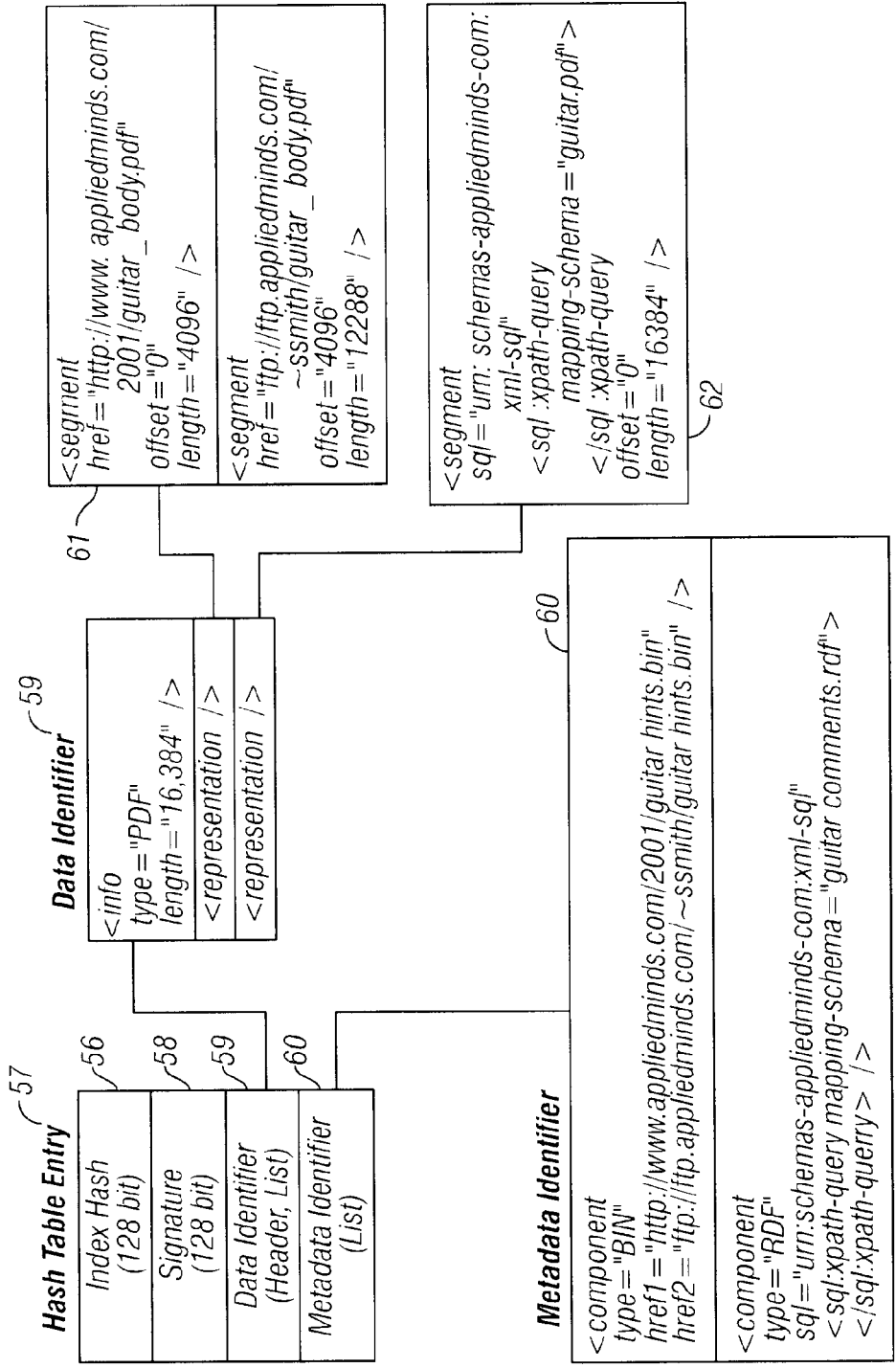
FIG. 5b is a block schematic diagram showing the structure of the hash table entry according to the invention.

FIG. 5b denotes the structure of a hash table entry 57. Along with the index hash 56 and signature 58, a hash table entry 57 contains a data identifier 59 describing the data object's type, length, and one or more representations of the object's data 61, 62. The hash table entry 57 also contains a metadata identifier 60, which includes an indication of the annotations of the data object 50.

Index Hash

The index hash may be computed using a combination of one or more of the following methods.

Method P is padding algorithm applied to all data to ensure it is of sufficient length.

Methods H, I, and D may be applied to padded data, such as that generated by Method P, to generate the index hash used to identify a data object. Method H is a simple implementation, and Method I is an approach extended to take advantage of vector operations available on microprocessors. Method D employs a different approach capitalizing on the ability of a vector processor to perform dot products rapidly.

Method P (Padding data) Given a piece of data, pad it to a length which is a multiple of B words.

P1 [Initialize] Set I<-(length of the data in bytes)

P2 [I mod B==0?] Set I<-I mod B. Finish if I==0. If not, add some data.

P3 [Append number of remaining bytes] Append a byte containing the value I.

P4 [I==0?] Decrement I. Finish if we are there.

P5 [Append the data] Append bytes from the original data one at a time, decrementing I. If I reaches zero, finish. If we run out of bytes, loop to step P3.

Note that in step P5, the data may be appended from the beginning of the input stream, which requires that the first B—2 bytes of data be stored. Alternatively, the data can be appended from the beginning of the last block of data read in.

The following code implements the latter method.

```
class PaddedStream {
public:
        PaddedStream(int pad);
        ~PaddedStream( );
        void setStream(int fd);
        int getChar(unsigned char *c);
        int getInt(unsigned int *i);
        int getLong(unsigned long *l);
        int fillBufferFromFile( );
private:
        int getBuff(unsigned char *b, int n);
        char *start;
        int padlen;
        int fd;
        int outcount, buffercount;
};
PaddedStream::PaddedStream(int pad)
{
        padlen=pad<<2;
        buffercount=0;
        outcount=0;
        start=(char *)calloc(padlen, sizeof(char));
}
PaddedStream::~PaddedStream( )
{
        free(start);
}
void
PaddedStream::setStream(int infd)
{
        outcount=0;
        fd=infd;
        fillBufferFromFile( );
}
int
PaddedStream::fillBufferFromFile( )
{
        int i, index;
        index=buffercount=read(fd,start,padlen);
        if(buffercount>0)
                while(index<padlen){
                        start[index]=(padlen-index) >> 2;
                        index++;
                        i=0;
                        while(i<buffercount) {
                                start[index++]=start[i++];
                                if(index==padlen) break;
                        }
                }
        return buffercount;
}
int
PaddedStream::getBuff(unsigned char *b, int n)
{
        int i;
        for(i=0;i<n;i++){
                if(outcount<padlen) {
                        b[i]=start[outcount++];
                } else if(fillBufferFromFile( )) {
                        outcount=0;
                        b[i]=start[outcount++];
                } else break;
        }
        return i;
}
int
PaddedStream::getChar(unsigned char *c)
{
        return getBuff((unsigned char *)c, sizeof(char));
}
int
PaddedStream::getInt(unsigned int *i)
{
        return getBuff((unsigned char *)i, sizeof(int));
}
int
PaddedStream::getLong(unsigned long *l)
```

-continued

```
{
    return getBuff((unsigned char *)l, sizeof(long));
}
```

Figure 6:
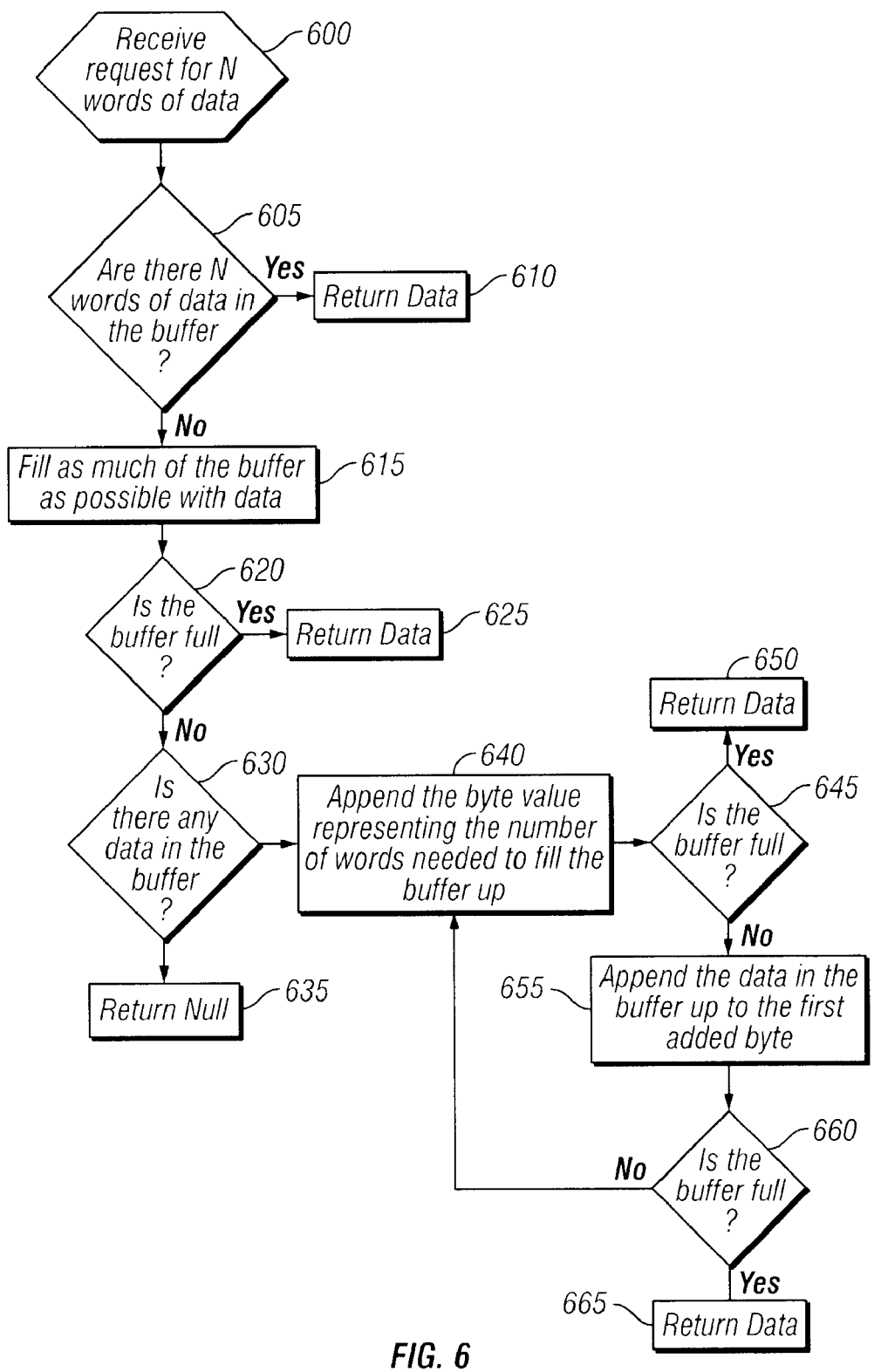
FIG. 6 is a flow diagram showing the implementation of a padding technique according to the invention.

FIG. 6 shows a flow chart detailing the preferred implementation of Method P according to the invention. In this technique a request is received for N words of data (600). A test is performed to determine if there are N words of data in the buffer (605). If there are, the data are returned (610). If not, the system fills as much of the buffer as possible with data (615). Thereafter, a test is performed to determine if the buffer is full (620). If it is, the data are returned (625). If not, a test is performed to determine if there are any data in the buffer (630). If not, a null value is returned (635). If there are data in the buffer, the byte value representing the number of words needed to fill the buffer is appended (640) and a test is performed to determine if the buffer is full (645). If the buffer is full, the data are returned (650). If not, the data in the buffer are appended up to the first added byte (655). Thereafter, a test is performed to determine if the buffer is full (660). If the buffer is full, the data are returned (665). If the buffer is not full, the process again appends the byte value representing the number of words needed to fill up the buffer and continues (640).

Method H (Generating the identity) Given a padded data stream as above, produce a 128-bit identity. The data are stored in a byte array M [1 . . . m]. The array H[j] contains 32-bit values H [0 . . . n−1], where n≦16 and n has no factors in common with 33. The method uses one 64-bit register rA and one 128-bit register rB which contains the final value. Initially rB is set to a non-zero value $H_0$. $H_0$ may be, for example, the first 128 binary digits of π. rB is accessible as four 32-bit registers rB[[0 . . . 3]]. rA is accessible as two 32-bit registers rA[[0 . . . 1]].

```
H1 [initialize] Set i<- 1,j<- 0,rB<-H_0.
H2 [collect] Set rA[[0]]<-M[i...i + 3]. Set rA[[1]]<-0. Set i<- i +4.
H3 [multiply] Set rA<-rA × H[j]mod 2^64. Set j<-(j +1) mod n.
H4 [middle] Set rA<-(rA >> 16)&0x00000000FFFFFFFF.
H5 [multiply in] Set rA<-(rA × rB[[3]])mod 2^64.
H6 [middle] Set rA<-(rA >> 16)&0x00000000FFFFFFFF.
H7 [subtract] Set rB[[2]]<-(rA - rB[[2]])mod 2^32.
H8 [rotate] Rotate rB left by 33 bits.
H9 [loop] If i < m,loop to step H2. Otherwise, finish, rB contains
    the identity.
```

Method I (Generating the identity, parallel) Given a padded data stream, produce a 128-bit identity. The data are stored in a byte (8-bit chunks) array M[1 . . . m]. The array H[j] contains 32-bit values H[0 . . . n−1] where n≦16 and n has no factors in common with 33. The method uses two 128-bit registers rA and rB. rB contains the final value. Initially, rB is set to a non-zero value $H_0$. $H_0$ may be, for example, the first 128 binary digits of π. Both registers are accessible as four 32-bit registers rX[[0 . . . 3]] or as two 64-bit registers rX[0 . . . 1].

```
I1 [initialize] Set i <- 1,j <- 0.
I2 [collect] Set rA[[0]] <- M[i ... i+3]and rA[[2]] <- M[i+4... i+7].
    Set rA[[1]] <- 0 and rA[[3]] <- 0. Set i <- i+8.
I3 [multiply] Set rA[1] <- rA[1] × H[j]mod 64 and
    rA[0] <- rA[0]× H[(j+1)mod n]mod 2^64. Set j <-(j+1)mod n.
I4 [middle] Set rA<-(rA 16)&0x
```

-continued

```
    00000000FFFFFFFF00000000FFFFFFFF.
I5 [multiply in] Set rA[1]<-(rA[1] × rB[[3]])mod 2^64 and
    rA[0] <- (rA[0] × rB[[1]])mod 2^64.
I6 [middle] SetrA<-(rA>>16)&0x
    00000000FFFFFFFF00000000FFFFFFFF.
I7 [subtract] Set rB[[2]]<-(rA[[2]] - rB[[2]])mod 32 and
    rB[[0]]<-(rA[[0]] - rB[[0]])mod 2^32.
I8 [rotate] Rotate rB left by 33 bits.
I9 [loop] If i < m, loop to step I2. Otherwise, finish, rB contains
    the identity.
```

The values H are selected to have the following properties:
1. Maximal average pairwise Hamming distance.
2. Equal number of 1 and 0 bits.

For example, the set shown in FIG. 7 may be used. This set has no pair of bit vectors with more than eight bits in common. Note that any permutation of rows or columns of this set also satisfies the requirements. It is also possible to permute the rows or columns independently of the first and last 16 bits.

Method D takes advantage of vector processor capabilities using long dot products. The data are assumed to be padded to a multiple of n (size of H) 32 bit values, as, for example, provided by Method P. The algorithms may be adjusted to accommodate a matrix H of different dimension.

Method D (Generating the identity dot products). Given a padded data stream, produce a 128-bit identity. The data are stored in a byte array M[1 . . . m]. An array H[j] as above is again used, with the additional restriction that n be even. The method uses three 128-bit registers rA, rB and rC. rC contains the final value. All registers are accessible as four 32-bit registers rX[[0 . . . 3]] or as two 4-bit registers rX[0 . . . 1].

```
D1 [initialize] Set i <- 1,j <- 0, rB <- 0.
D2 [collect] Set rA[[0]] <- M[i... i+3] and rA[[2]] <- M[i+4... i+7].
    Set rA[[1]] <- 0 and rA[[3]] <- 0. Set i <- i+8.
D3 [multiply] Set rA[1] <- rA[1] × H[j]mod2^64 and
    rA[0] <- rA[0]• H[(j +1)]mod 2^64. Set j <- (j +2).
D4 [dot sum] Set rB[0] <-(rB[0]+rA[0])mod2^64 and
    rB[1]<- (rB[1]+ rA[1])mod2^64.
D5 [dot loop] Set j <- j+2. If j < n−1,loop to step D2. Otherwise, set j <- 0
    and continue.
D6 [dot shift] Set rB <- rB >> 16, shifting in zeros.
D7 [add in] Set rC <- rC + rB
D8 [rotate] Rotate rC right 33 bits.
D9 [loop] If i < m, loop to step D2. Otherwise, finish, rC contains
    the identity.
```

The following code may be used to implement Method D. The code is written as a 256 bit implementation. However, it may be trivially modified to achieve the 128 bit implementation described in Method D, or implementations based on other word sizes. This implementation uses the Padded-Stream class defined in the Method P code above.

```
void dotprodident(int instream, int *id)
{
    PaddedStream P(128);
    unsigned long long accum, outll, outlh, outhl, outhh;
    unsigned long long ilowlow, ilowhi, ihilow, ihihi;
    unsigned int a, b, i;
    P.setStream(instream);
    accum=0;
    ilowlow=0;
    ilowhi=0;
    ihilow=0;
    ihihi=0;
```

-continued

```
//assumes that padded length is a multiple of 64 ints
    while(P.getInt(&a)>0){
        P.getInt(&b);
        //build up the dot product of 16 values mod 2^64
        for(i=0;i<14;i+=2){
            accum+=(unsigned long long)H[i]*(unsigned long long)a;
            accum+=(unsigned long long)H[i+1]*(unsigned long
            long)b;
            P.getInt(&a);
            P.getInt(&b);
        }
        accum+=(unsigned long long)H[i]*(unsigned long long)a;
        accum+=(unsigned long long)H[i+1]*(unsigned long long)b;
        //shift the dot product over and add it to the identity mod 2^128
        accum = accum >> 16;
        ilowlow+=accum;
        //in assmebly this is just a jump on overflow    if(ilowlow<
        accum){
            ilowhi++;
            if(ilowhi<1){
                ihilow++;
                if(ihilow<1){
                    ihihi++;
                }
            }
        }
        //33 bit roll
        outll=(ilowlow&0x1FFFFFFFFll) << 31;
        outlh=(ilowhi&0x1FFFFFFFFll) << 31;
        outhl=(ihilow&0x1FFFFFFFFll) << 31;
        outhh=(ihihi&0x1FFFFFFFFll) << 31;
        ilowlow=(ilowlow >> 33) | outlh;
        ilowhi=(ilowhi >> 33) | outhl;
        ihilow=(ihilow >> 33) | outhh;
        ihihi=(ihihi >> 33) | outll;
    }
    id[0]=(ihihi&0xFFFFFFFF00000000ll)>>32;
    id[1]=(ihihi&0xFFFFFFFF);
    id[2]=(ihilow&0xFFFFFFFF00000000ll)>>32;
    id[3]=(ihilow&0xFFFFFFFF);
    id[4]=(ilowhi&0xFFFFFFFF00000000ll)>>32;
    id[5]=(ilowhi&0xFFFFFFFF);
    id[6]=(ilowlow&0xFFFFFFFF00000000ll)>>32;
    id[7]=(ilowlow&0xFFFFFFFF);
}
```

Signature

Like the index hash, the signature of the data object is computed using the data object type and content. However, the signature is computed using a cryptographically strong technique.

Data Identifier

A data identifier contains a data object's type, length, and representation. Typically, data objects only have one representation, but data objects may have multiple alternate representations, for reason of redundancy, efficiency, or administrative convenience. These multiple representations may be stored in different places or even different formats, but they must describe exactly the same object.

A data object's representation may contain one or more segments. Typically, data objects only have one segment, but it is possible to spread the representation of an object across multiple segments. For each segment, the data identifier contains information denoting how to find a string of bits that represent a part of the data object. For example, a segment may be specified by a path to a file and an offset and length of the string of bits representing the segment within the file. Alternatively, the segment may be specified by a query made to a database.

The data object is constructed by obtaining the bits associated with each segment concatenating them together sequentially, and interpreting them as specified by the type. Once all of the bits are collected, they may then be verified by comparing the index hash computed from the concatenated data and the type with the index hash stored in the hash table. In some circumstances, the constructed object may also be verified by checking the cryptographically strong signature of the object, again computed from the data and the type. All segments of the data object of at least one type must be accessible for the object to be accessible.

Metadata Identifier

A metadata identifier contains one or more components that indicate the type and location of one or more links annotating the data object. Each metadata component can specify multiple alternative locations where the metadata can be found. Each location has a type specifying the format of the metadata stored in that location. For example, the same metadata may be stored in human readable text format in one location, and in a compiled binary format in another location.

The metadata for an object are constructed by obtaining the data from one location indicated by each component. The metadata are then collected and interpreted based on each location's type. It is not necessary that all components be accessible. Inaccessible components are ignored, so a user only sees the metadata associated with accessible components.

The metadata identifier may be implemented using a fixed length handle, preferably of 128 to 196 bits, that can be interpreted either as a first-class-object "pointer," or as a literal. At least one of the bits has to be used to distinguish which type it is. Literals are object that are small enough to store the data in the handle.

handle=index-hash|literal-representation

If the handle is an index=hash, it is generated from the hash code of the data/type pair. If the handle is a literal, some of the bits are used to say what type it is.

literal-representation=literal-type literal-data
literal=literal-type literal-data
literal-type=fixnum|float|short-string|global-
    symbol|time|location|character| . . .

The fixnum is a 64+ bit signed integer. The float is an IEEE floating point number. Short-string is any string of up to N ASCII characters. Links can then be represented by triples of handles. Typically, the label of a link is a global symbol, but it could also be another object.

link=from-connection to-connection label-connection
from-connection=handle
to-connection=handle
label-connection=handle First class objects are the only kind of objects that can have metadata attached to them. A first-class object can be a literal, but most literals are not first-class objects. A first-class object can also be a link, but most links are not first class objects.

object=first-class-object|literal
first-class-object=small-first-class-object|large-first-class-
    object
small-first-class-object=small-literal metadata-locator
large-first-class-object=handle object-type data-locator sig-
    nature metadata-locator
large-object-type=data-type|big-literal-type
object-type=Link|Binary|Text|JPEG|Postscript|RTF|
    Wave| . . .

Large first-class objects, that is all first-class objects except literals, have a list of references to external places where segments of their data is stored. Most object have just one segment, but when there are more than one, the data is assembled by concatenating these segments together.

data-locator={data-component-locator}

Each segment can have pointer to an alternate component for the same data. The different metaweb servers may have the alternatives in a different order for performance reasons.

data-segment-locator=resource-locator [alternate-data-segment-locator]
alternate-data-segment-locator=data-segment-locator All first-class objects have a list of references to external places where components of their metadata are stored. The data are assembled by combining the metadata from these components.

metadata-locator={metadata-component-locator}

Each component can have pointer to an alternate component for the same metadata. Again, the different metaweb servers may have the alternatives in a different order for performance reasons. Each alternative indicates the format of that alternatives representation of the component.

data-component-locator=metadata-data-format resource-locator [alternate-metadata-component-locator]
alternate-metadata-component-locator=metadata-component-locator
metadata-data-format=RDF|Complied| . . .

A resource location is a URL. It may be a pointer to a file, or a database query. It specifies where and how the data is to be found.

resource-locator=protocol domain specification-string

Descriptive Scenarios

The structure of the system described in the previous sections lends itself to a great variety of system features and functions. An illustration of some of these features and functions is provided in the following scenarios.

Search/Query

Figure 8:
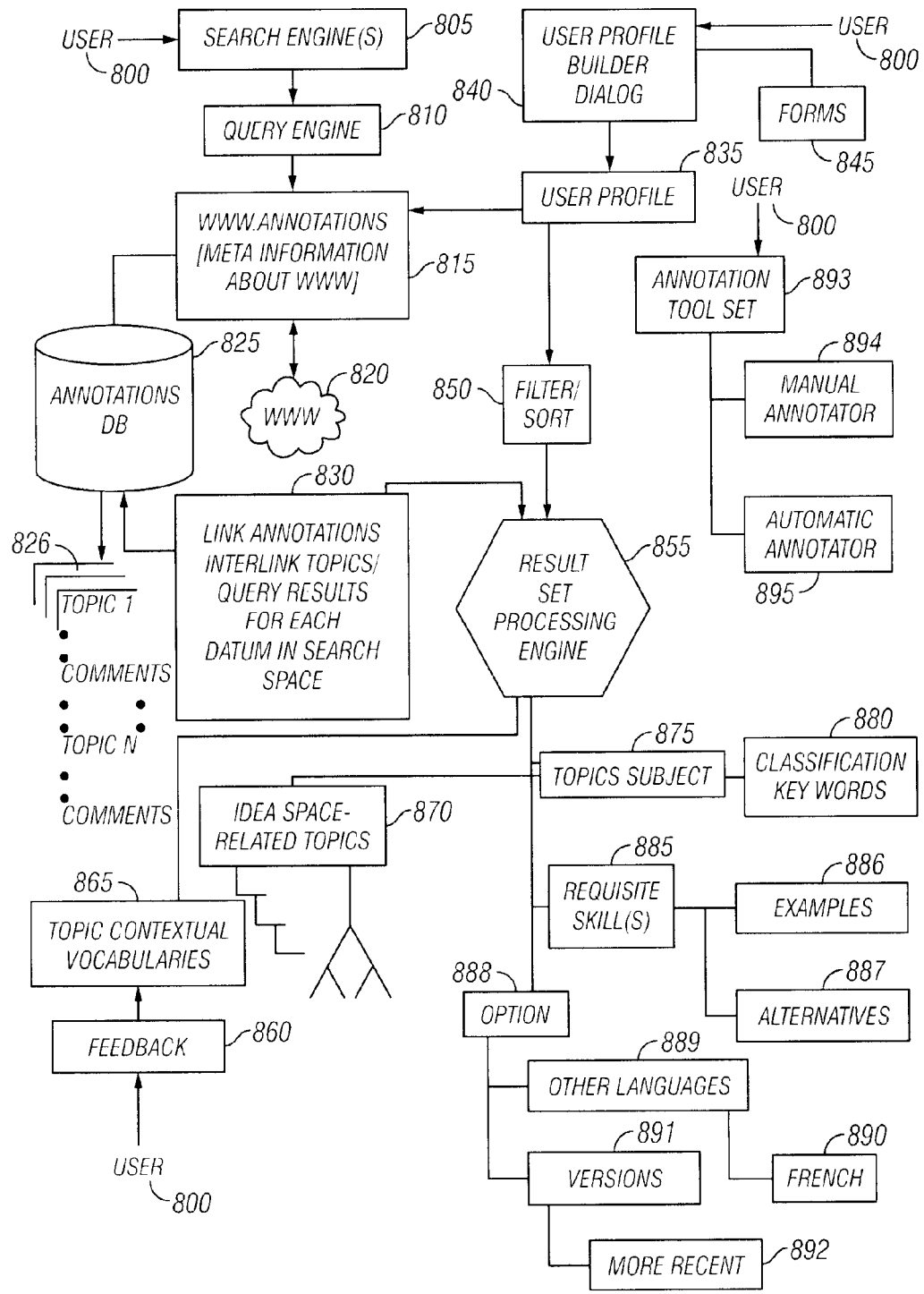
FIG. 8 is a block schematic diagram showing an overall system and system elements according to the invention.

In FIG. 8, a user 800 initiates a query using any of several search engines 805, which drive a query engine 810. The query engine 810 accesses meta-knowledge 815 about the universe of knowledge, which in this case is the World Wide Web 820. The meta-knowledge 815, or user annotations and document metadata regarding the content in the universe of knowledge, are stored in an annotations database 825 which resides on one of the content servers. The annotations are themselves content, and may in turn be linked to other content and topics 826 in the search space 830.

User Profile

A user 800 of the knowledge web may have a user profile 835 created, for example, using a user profile builder dialog 840 that uses various forms 845 to build a user profile 835. The user profile 835 works in connection with the meta-knowledge to filter the knowledge, so that the user 800 gets the information they want when they want it. The user profile 835 is also used as a filter/sort mechanism 850 in connection with a result-set processing engine 855 that allows the user 800 to add annotations and link topics to the knowledge.

Result-Set Processing System

The result-set processing engine 855 also interacts with a user 800 when the user 800 provides feedback 860 on topics and contextual vocabularies 865. The feedback 860 is applied in connection with the results provided to the user 800, and it is also used to build up the annotations database 825.

The result-set processing engine 855 provides features to manage the idea space of the knowledge and related topics 870. There is a topic subject 875 based upon classification and keywords 880. There is also a provision for determining requisite skills 885 with regard to the information produced by the query on the knowledge web which is supported by examples 886 and alternatives 887. Finally, there are a series of options 888 provided, which may include, for example, displaying the information using other languages 889, e.g., French 890, and other versions 891 of the information, for example, more recent versions 892, although in some cases, the user 800 may desire to review an earlier version of the information.

Annotations

The user 800 also interacts with an annotations tool set 893 which provides a manual annotator 894 that allows annotation by the user 800 or by the proprietor of the information. As well, the system provides an automatic annotator 895.

Registration of Content

Figure 9:
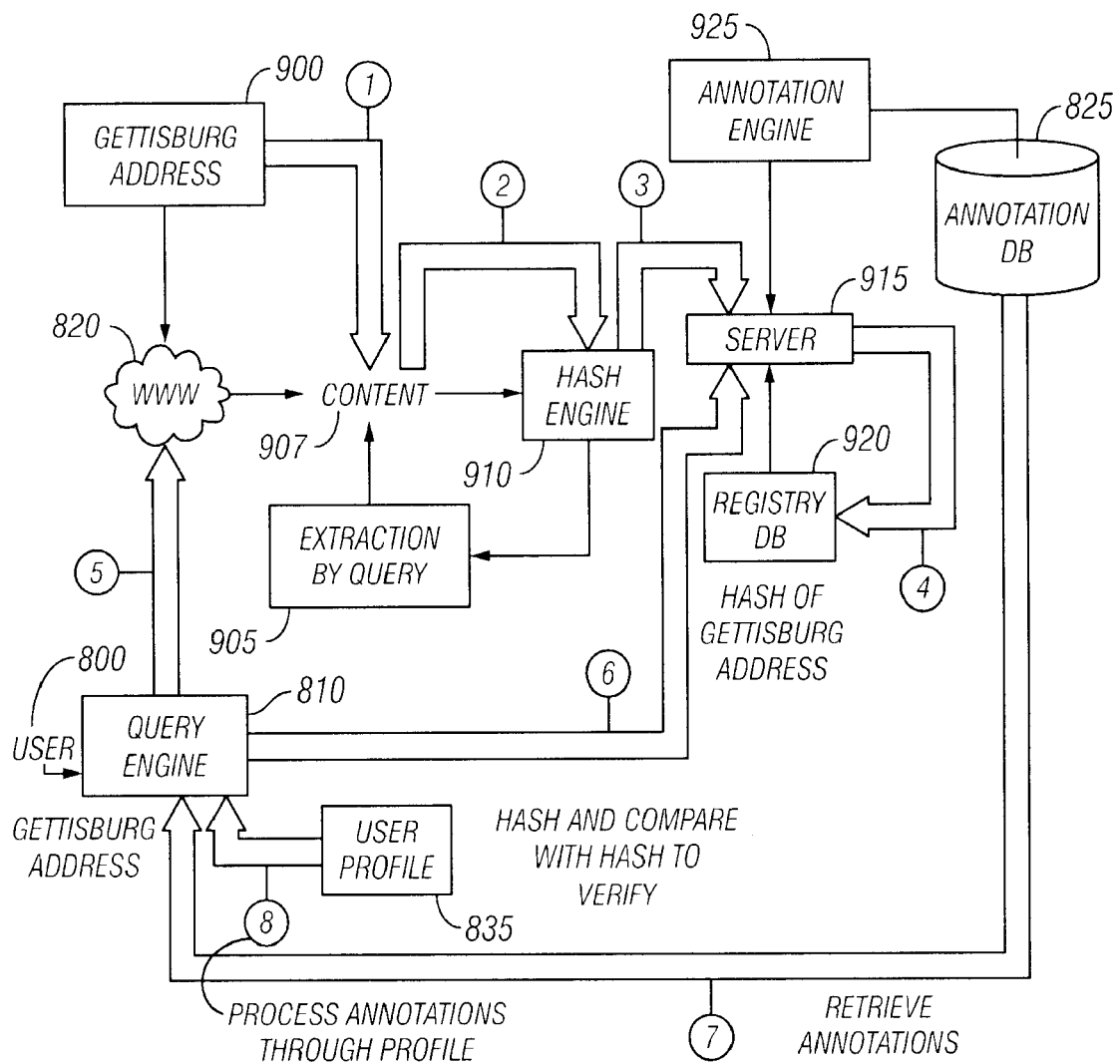
FIG. 9 is a block schematic diagram showing information flow within a system according to the invention.

In FIG. 9 a piece of content, such as the Gettysburg Address 900, is registered within the knowledge web and also exists in universe of available knowledge, i.e., the World Wide Web 820. In this particular scenario, the content is extracted from the web 820 by a query 905 (numeric designator 1). The content 907 is provided to a hash engine 910 (numeric designator 2) to create an index hash 56. The hashed version of the content is provided to a registry server 915, (numeric designator 3) and is stored in a registry database 920, (numeric designator 4). The registry server 915 operates in conjunction with the annotation engine 925 which accesses the annotation database 825 to add any user annotations provided at this time as well as billing activities if applicable.

Annotation System and Process

Figure 10:
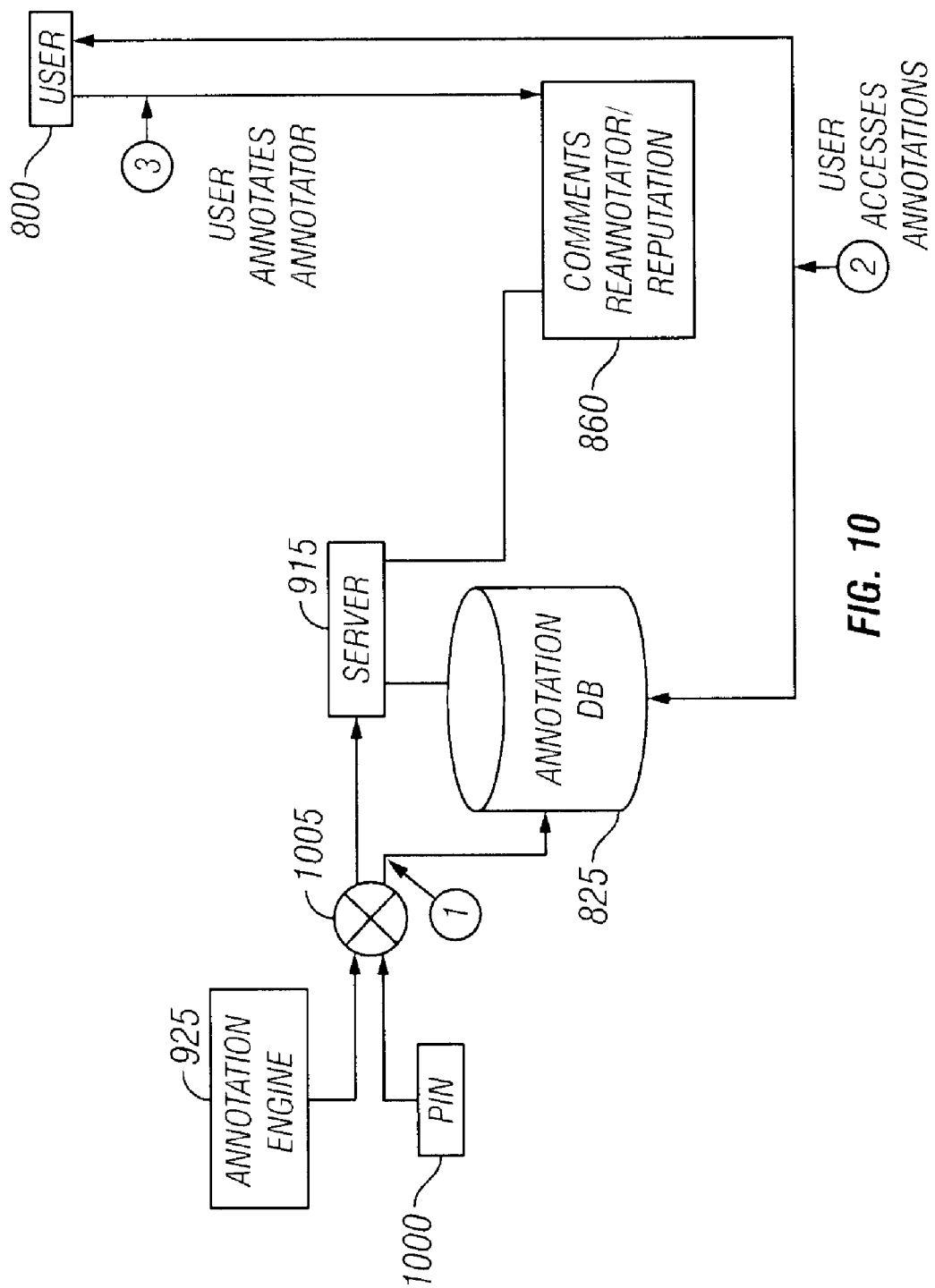
FIG. 10 is a block diagram showing an annotation element according to the invention.

In FIG. 10, the annotation system is shown in greater detail. The annotation engine 925 operates to provide annotations to the annotation database 825 once the user 800 has been verified. Such verification may be performed by any means, but in the exemplary embodiment of the invention, is provided when the user 800 introduces a personal identification number (PIN) 1000. A security technique 1005 is applied that allows the annotator to access the annotation database 825 for reading and or writing an appropriate (numeric designator 1). The user 800 thereafter accesses the annotations, as indicated in FIG. 10 (numeric designator 2). Thereafter, the user can annotate the annotations, for example, to provide feedback 860 in the form of comments, reviews, ratings, and the like, (numeric designator 3).

Display of Content and Annotations

Turning back to FIG. 9, when a user 800 uses a search engine 805 to posit a query, for example, "Tell me about the Gettysburg Address," the query engine 810 in this example accesses both the universe of available information (numeric designator 5), and the metaweb server 915 (numeric designator 6). This results in the retrieval of knowledge from the universe of knowledge resulting from the user's query. Using the knowledge retrieved, an index hash 56 is created, which is used to access the registry entry for that piece of knowledge in the registry database 920. Thereafter, user annotations and document metadata relating to the knowledge may be retrieved from the annotations database 825, (numeric designator 7). Finally, a user profile 835 may be applied to process the annotations so that the user 800 receives only those annotations of interest (numeric designator 8).

Figure 11:
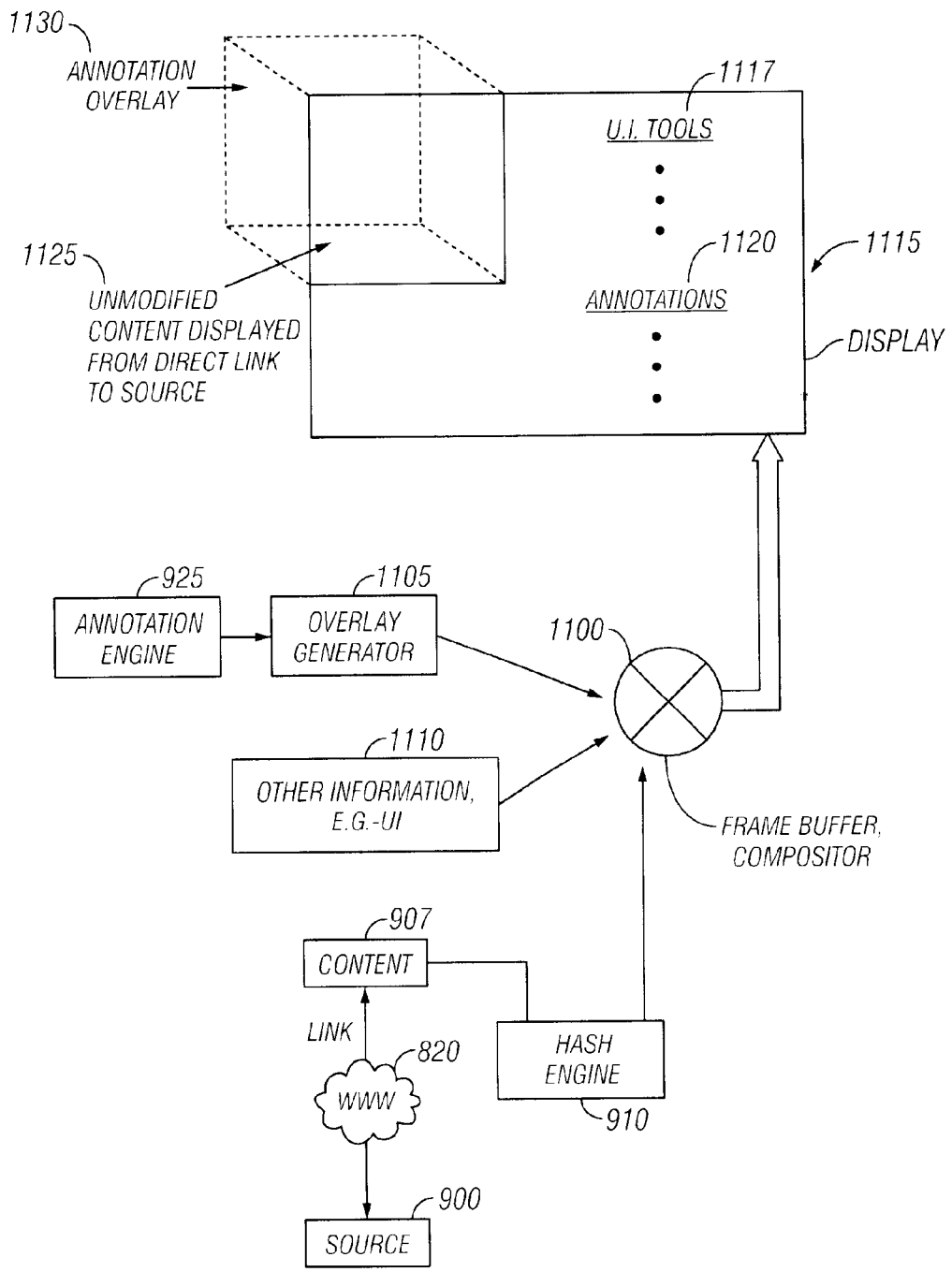
FIG. 11 is a block schematic diagram showing a presentation element according to the invention.

FIG. 11 provides a schematic diagram showing the annotation process and compositing of information for display to a user 800. In FIG. 11, the universe of available information, i.e., the World Wide Web 820, is used to access a source 900 document, i.e., the Gettysburg address. The content is retrieved in this example by following a link as is known in the art. Thereafter, the content 907 is subjected to a hash engine 910 as described above. The content information is thereafter provided to a frame buffer or compositor 1100. Such techniques as frame buffering and compositing are well known in the art and are not discussed herein. Additionally, the annotation engine 925 operates in conjunction with an overlay generator 1105 to provide the annotations 1120 to the display

1115. Finally, any other information, such as user interface features 1110 are provided to the frame buffer or compositor 1100.

The result is a displayed image 1115, which includes annotations 1120, user interface features and tools 1117, and the unmodified content from the source 1125. The annotation overlay 1130 is also provided. This aspect of the invention concerns the provision of content, for example, copyrighted material, without modifying or in any way altering or copying the material, Rather, the Knowledge Web follows the link to the source information and merely displays the information on the display 1115. The annotation overlay 1130 superimposes the annotations onto or alongside the unmodified content. In this way, the invention allows the use of content annotations without copying the content to any persistent cache or storage medium. This obviates the likelihood that copyrights are violated.

Payments/Micropayments

Figure 12:
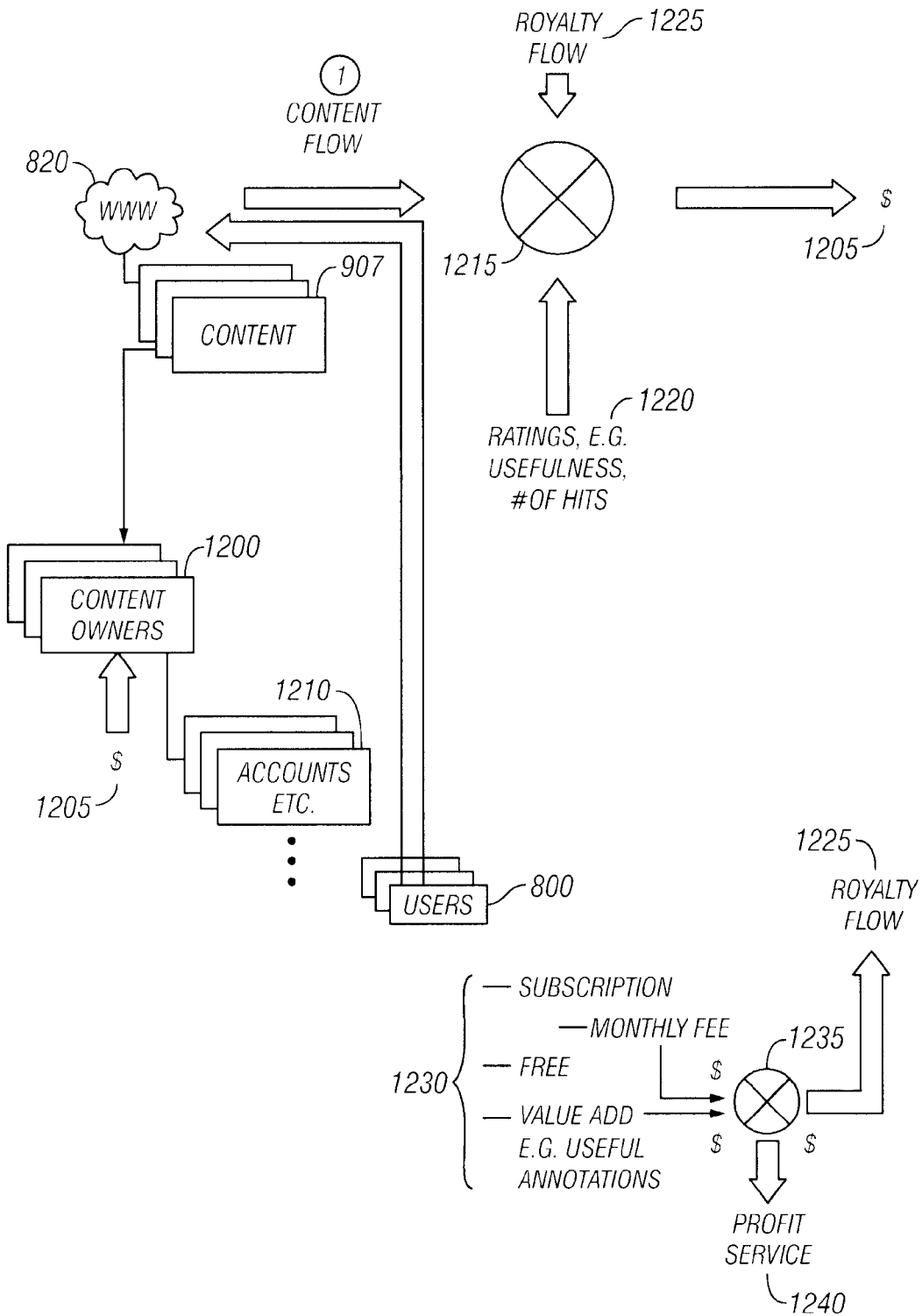
FIG. 12 is a block schematic diagram showing a business model for an information market according to the invention.

FIG. 12 illustrates a compensation scheme by which content 907 accessed from the universe of knowledge, i.e., the World Wide Web 820, allows content owners 1200 to receive compensation 1205 which may be maintained in an account 1210 or otherwise provided to the content owner 1200. In this aspect of the invention, a content flow is generated through the knowledge web (numeric designator 1). This content flow is provided to an accounting system 1215 in which the access by users 100 to content through the Knowledge Web is combined with ratings information 1220 provided by the users 800 through specialized user annotations, for example, the usefulness of the information and/or a number of times the content has been accessed. As a result, fees paid by users (i.e., the royalty flow 1225), as discussed in more detail below, are apportioned to the content owners 1200 to produce a compensation 1205 flow based on such access and usefulness.

The users 800 are provided with various access plans 1230, such as a subscription, for example, based on a monthly fee; free access; or a value added access, for example where users 800 pay to view annotations that are considered to be useful. A user accounting engine 1235 produces a royalty flow 1225 which is then used to determine compensation to content owners 1200. The user accounting engine 1235 also extracts revenue for the Knowledge Web in the form of profits from the service 1240.

Personalized Knowledge Retrieval with User Profiles

Figure 13:
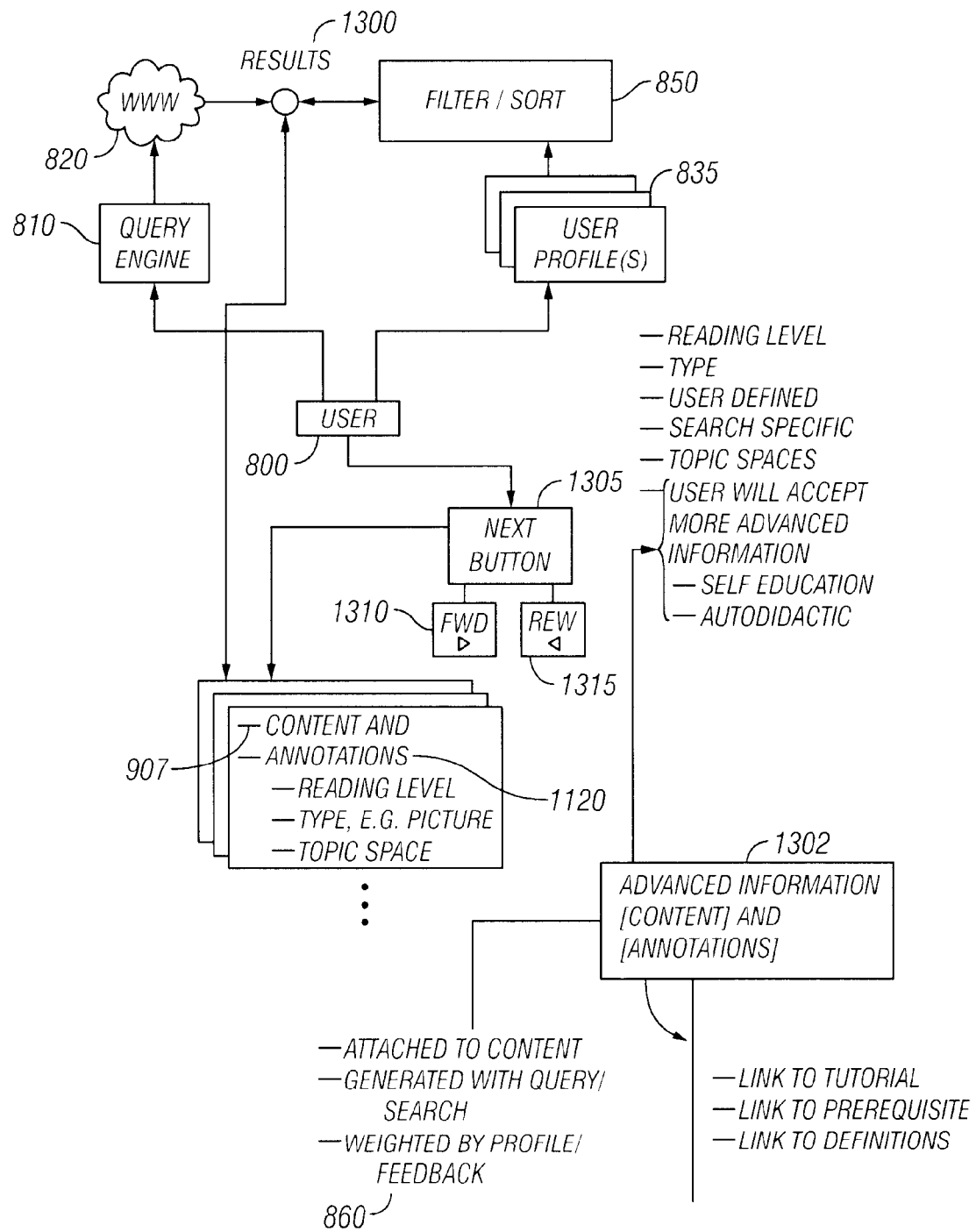
FIG. 13 is a block schematic diagram showing a profile element according to the invention.

FIG. 13 illustrates a query session in which a user 800 posits a query through the query engine 810 to the universe of available knowledge, i.e., the World Wide Web 820. This generates various results 1300 in the form of content 907 and annotations 1120. The content 907 and annotations 1120 may be provided in various ways, for example, based upon the users reading level, the type of information preferred, e.g., a picture, the topic space (as discussed below). The results are produced both from the content source and by applying the user profile 835 to an annotation 1120 and a filter/sort 850 engine performing matches. In this way, the annotations 1120 are matched to the user's reading level, preference types, and topics as mentioned above. The user profile 835 is built with various types of information about the user 800 and in this example is generated through the use of a form 845 as discussed above. The user profile 835 includes such information as reading level, type or information preferred, user defined spaces, specific information preferred, topic spaces requested, and statements that the user 800 accepts more advanced information in certain topics, for example auto-didacticism. Further, the profile 835 may include an advanced information space 1302 in which the content 907 in annotations 1120 are provided in this particular way. For example, the annotations 1120 may link the content 907 to a tutorial to explain the content 907 to the user 800, there may be links to pre-requisites before the content 907 is readily understood, so that the user 800 is properly prepared for reviewing the contents 907, or there may be links to definitions. Further, the annotation 1120 may be attached to additional content 907 which provides context for the content 907 being reviewed. This additional information may be generated as part of the query and search posited by the user 800, and the information may be provided based upon a weighting based upon the user profile 835 and feedback 800 provided by the user 800, as well as feedback provided by other users.

Other User Interface Elements

As the user 800 peruses the results 1300, the user 800 may operate a "next" button 1305. The "next" button 1305 is an important learning feature provided by the invention in which a forward indication 1310 indicates to the Knowledge Web that the user 800 is finding the information and current path of the knowledge useful. In this case, the Knowledge Web proceeds along the path it is predicting as being useful to the user 800. There is also a "reverse" button 1315. By selecting the "reverse" button 1315, in this example, the user 800 provides feedback 860 that the path is not helpful and the Knowledge Web reformulates the basis for providing information. User 800 operation of the forward and reverse buttons 1310, 1315 is used to build up the profile 835 of the user 800, and also may be used to build further annotations 1120 and feedback 860 based on the usefulness of information.

Graphical User Interface—Visualization

Figure 14:
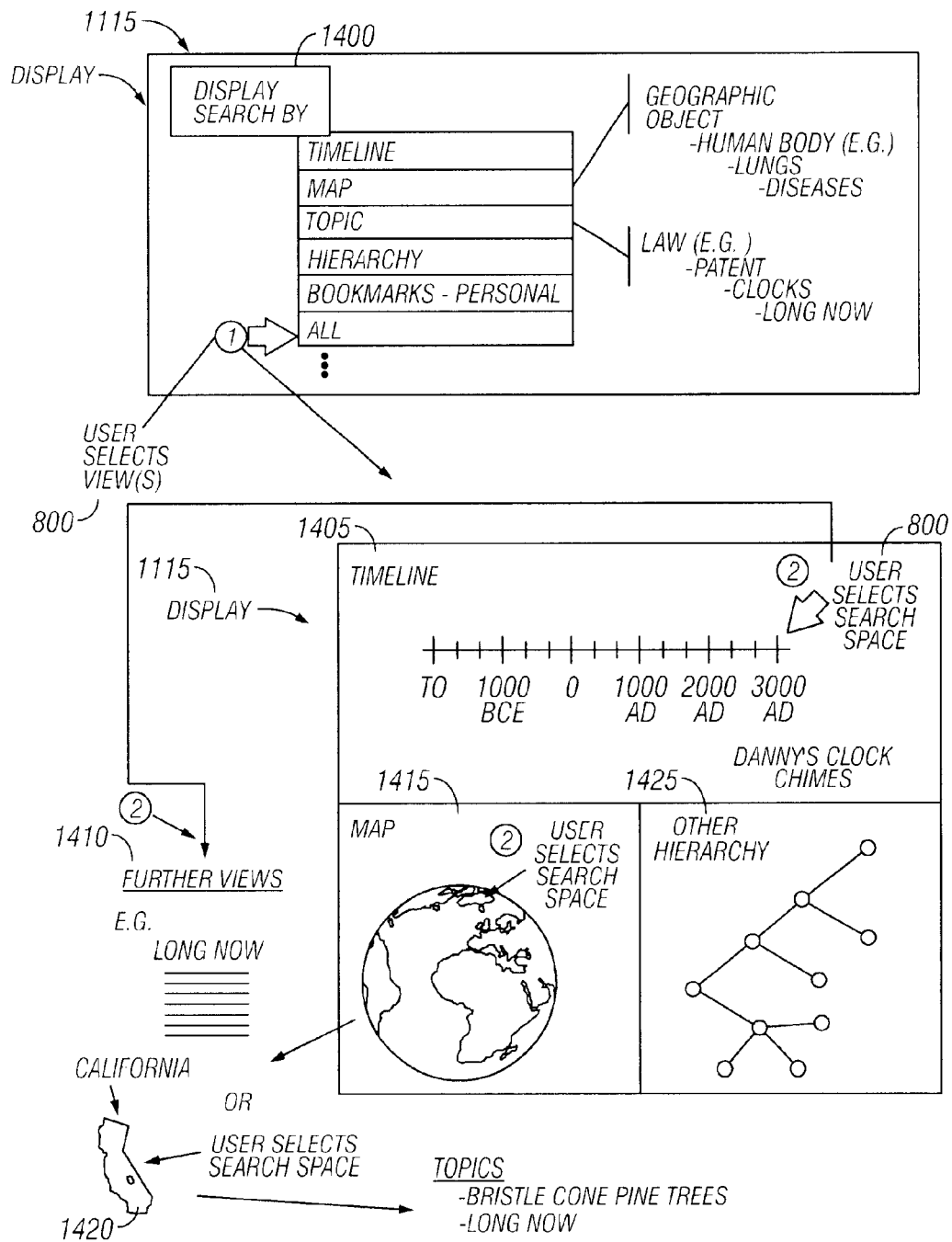
FIG. 14 is a block schematic diagram showing multiple search bases in multiple views to reduce the search space according to the invention.

FIG. 14 is a schematic representation of various visualization aspects of the knowledge web. In FIG. 14, a display 1115 is shown in which a dialog box 1400 provides a user 800 with various ways in which a search may be visualized. For example, the visualization may occur as a timeline; as a map (for example, geographic map with regard to countries, or geological features, or an object map, for example, with regard to the human body, where the map might point out the human beings lungs in connection with various human diseases); as a topic map (for example, the topic of the law with regard to patents, and in particular clocks, specifically with regard to clocks made by the Long Now Foundation); as a hierarchical display; as a display of personal bookmarks, or as a combination of several or all of these forms of visualization. These particular views are provided by means of example and those skilled in the art will appreciate that other visualizations and views may also be provided.

After the user 800 has selected a view, a display 1115 is presented to the user 800, as shown in FIG. 14 (numeric designator 1). The user may then select a search space, as shown in FIG. 14 (numeric designator 2). The search space could be, for example, based on a time line 1405, for example, where the Long Now Foundation's clock is shown to operate along a timeline relative to the number of years between clock chimes. The user 800 may also select further views 1410, as shown in FIG. 14 (numeric designator 3). For example, the user 800 may choose a map view 1415 that shows geographically where the Long Now clock is located. This view 1415 may be further enhanced by the user's selection of the map to produce an exploded view that shows more precisely or with better resolution the location of the desired item 1420. When the user 800 selects this particular search space, the Knowledge Web presents additional information about this geographical location. For example, the particular part of California where the Long Now Foundation is located is also known for bristle cone pine trees. Thus, when a user 800 selects this particular geographical location, related topics, such as bristle cone pine trees, are offered to the user 800.

Finally, the user 800 may choose to view the search results in another form, such as a hierarchy 1425.

Security

Figure 15:
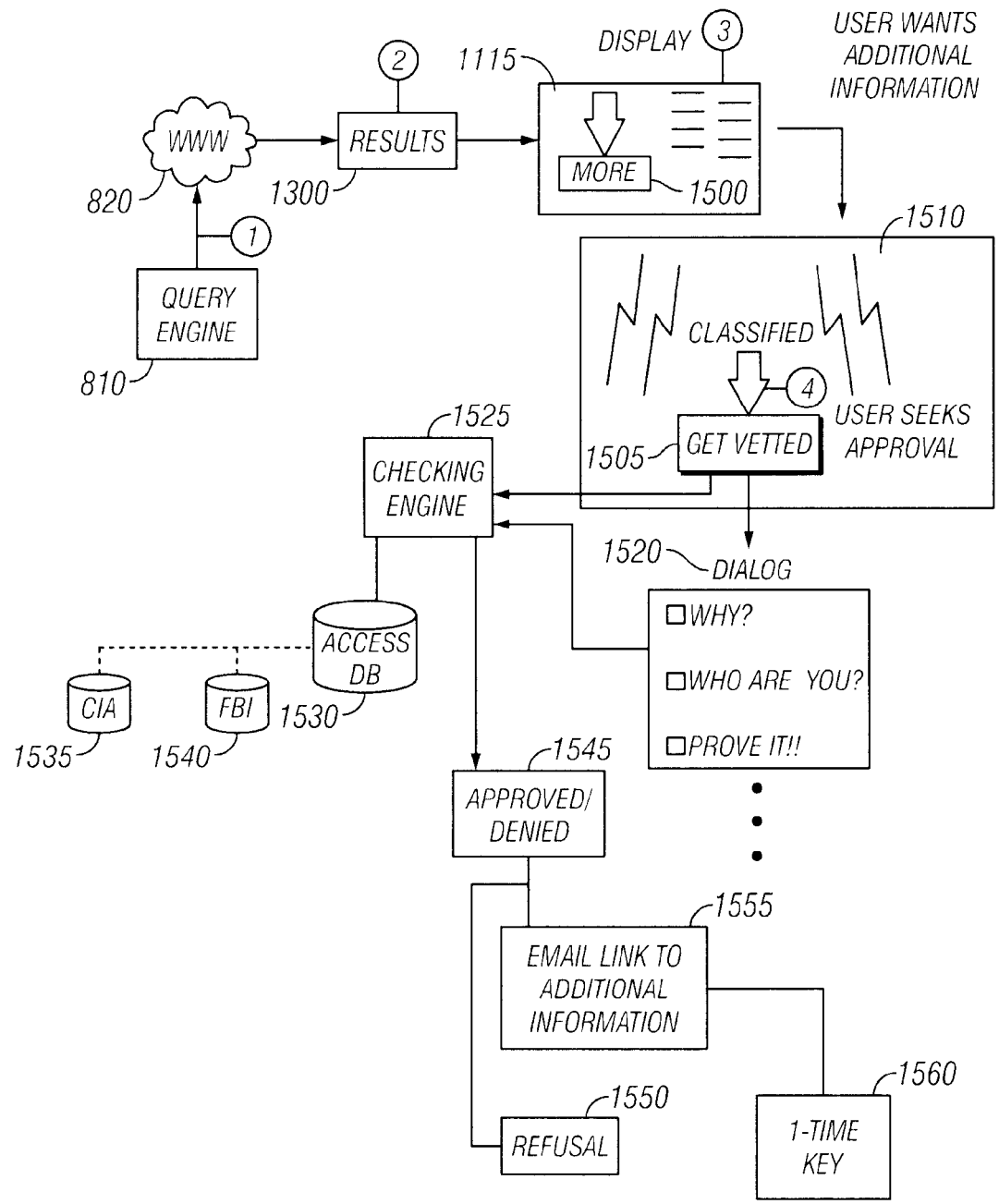
FIG. 15 is a block schematic diagram showing elements linking authorization, security, and commerce according to the invention.

FIG. 15 shows one security aspect of the invention. When a query is presented to the universe of knowledge 820 by the query engine 810, those results 1300 are produced as discussed above. This is indicated on FIG. 15 by the numeric designators (1) and (2). There is a space of information that is presented to the user 800 on the display 1115. If the user 800 desires to view more, then a "more" feature 1500 is selected by the user 800, as indicated on FIG. 15 by the numeric designator (3). The display 1115 then indicates in this example, that the information is classified and requires a certain level of security clearance. In such cases, the user 800 is provided with an opportunity to vet themselves to the system 1510, for example by selecting a "get vetted" button 1505 as indicated on FIG. 15 by the numeric designator (4). In the presently preferred embodiment of the invention, a dialog 1520 is presented which asks the user 800 such questions as "Why is the information wanted?", "Who is doing the asking?", and "Provide proof." The user answers are sent through a checking engine 1525 which compares the user information against an access database 1530 to determine the users levels of authorization with regard to the information desired. The access database 1530 may include additional databases which are independently checked, such as a CIA database 1535 or an FBI database 1540. The checking engine 1525 then provides a response to the user, approving or denying access 1545. If the request is denied, then the refusal 1550 is indicated to the user 800, either directly on the display 1115 or via a return message, such as an email message. If approval is granted, then an authorization mechanism is invoked. In the presently preferred embodiment of the invention, an email link is provided to the user 1555. When the user 800 opens the email and clicks on the link contained therein, a one-time key 1560 is provided that allows the user 800 to have one-time access to the classified information.

User Operations Using the Result Set Processing System

Figure 16:
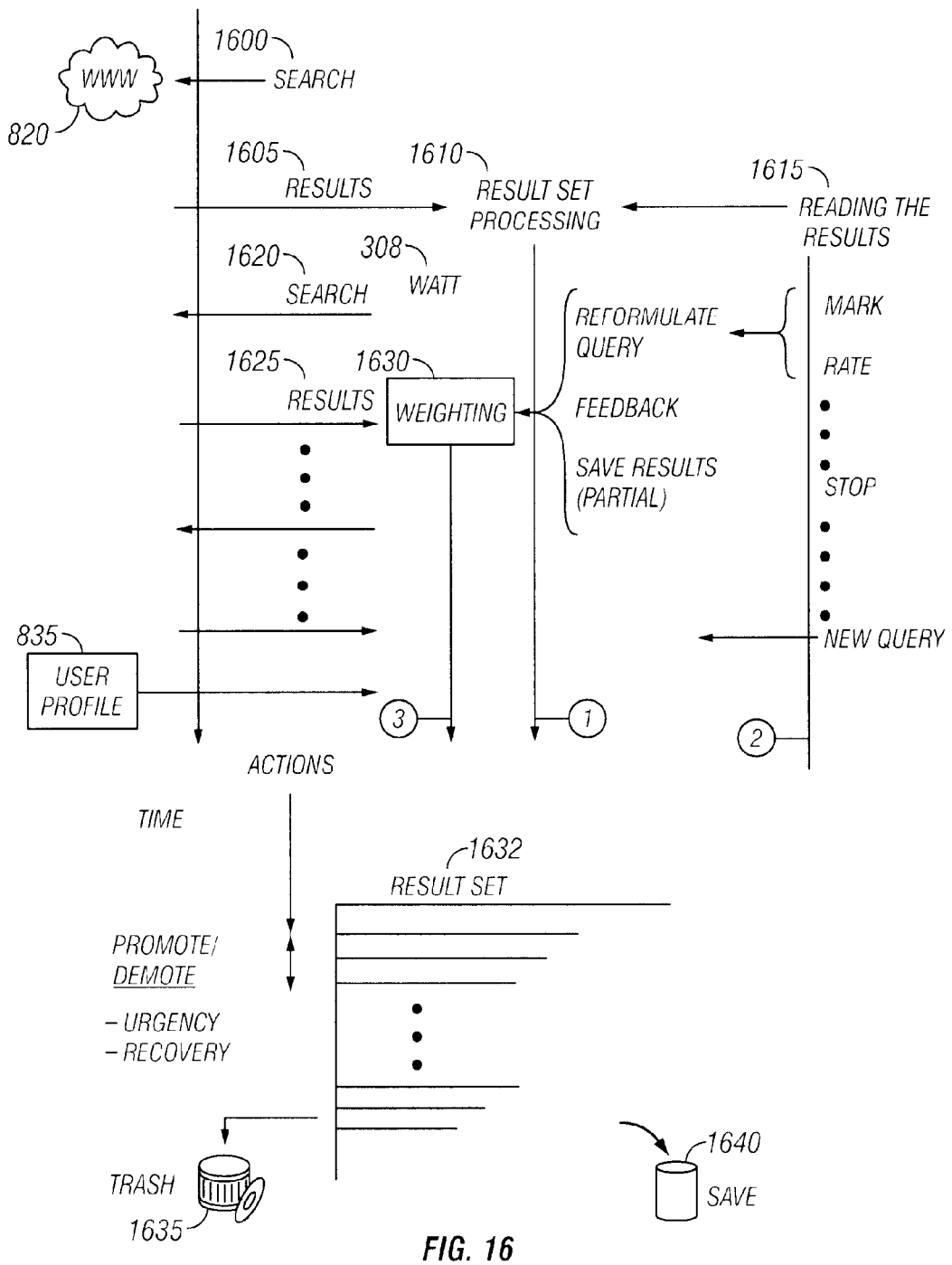
FIG. 16 is a block-schematic/flow diagram showing result set processing according to the invention.

FIG. 16 is a flow diagram showing the operation of the Knowledge Web in connection with the result-set processing 1610 system. When a search 1600 is commenced, access is made to the universe of available information 820 and results 1605 are provided through the result-set processing 1610 system which provides them to the user 800. One of the functions of the result-set processing 1610 system is to allow the user 800 to promote and demote information in terms of urgency and relevancy. Thus, when results 1605—including search results, user-created documents, email messages, and other forms of knowledge—are being placed in the result-set processing 1610 system, the movement of the information is affected by various factors which are discussed below. Such movement is shown in the FIG. 16 by the numeric designator (1).

User interaction with the result set moves information 1615 through the system. The user 800 may take such actions as continuing through reading results, during which the user 800 may mark the results, or rate them, may stop, or may present a new query. These actions are shown on FIG. 16 by the numeric designator (2). The Knowledge Web moves the results through the result-set processing system based upon such weighting as is appropriate in view of the user's actions. This weighting is indicated on FIG. 16 by the numeric designator (3). The user actions in reading the results 1615 may result in additional searching 1620 which produces yet additional results 1625. User actions may continue to produce additional searching and additional results with effects on the weighting 1630 of the information contained in the result set. Additionally, the user profile 835 may be applied to the results and to the weighting 1630, such that the promotion or demotion of information within the result set 1632 is a function of user profile, as well as user actions. As a result of this mechanism, information is either removed 1635 from the result set 1632 or saved 1640 and is ranked in the result set 1632 with regard to such features as urgency and relevancy in connection with the user query. This mechanism allows the user 800 to be presented with information that is most relevant to the user's query.

Search Space

Figure 17A:
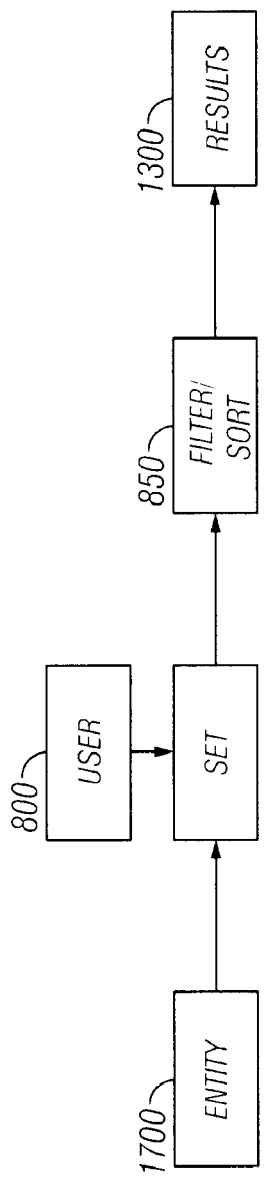
FIG. 17a shows a determination of display link and FIG. 17b shows a determination of search space according to the invention.
Figure 17B:
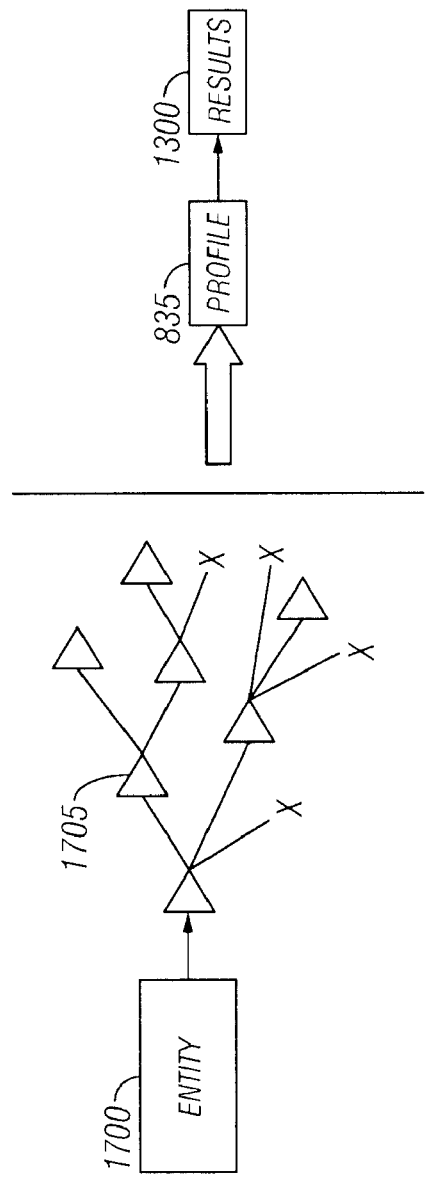

FIG. 17 illustrates the concept of search space 830 in connection with the knowledge web. In FIG. 17a, an entity 1700 such as the results 1300 of a query return from the search space 830 is investigated. The entity 1700 may be, for example, a corporation, or a country, or any other entity. The user 800 sets various values to be applied in the entity 1700 to discover information about the entity 1700 from the universe of available information. Thus, the user 800 might tell the Knowledge Web to follow a certain number of links, or to follow specific links. For example, with regard to a corporation, the user 800 may tell the Knowledge Web to follow subsidiaries of the corporation, follow general reporting of the corporation, or follow a particular product made by the corporation, e.g., kryptonite. The user settings are applied to information gathered about the entity 1700 from the universe of available information through the filter/sort engine 850 and annotation engine (not shown) discussed above, and the results 1300 are then provided to the user 800. FIG. 17b shows a two-stage search in which information about the entity 1700 from the universe of available information is first applied to an N-dimensional search space 1705. The results derived from the search space 1705 are then applied to the user profile 835 to produce the final results 1300 provided to the user.

Data Enrichment

Figure 18:
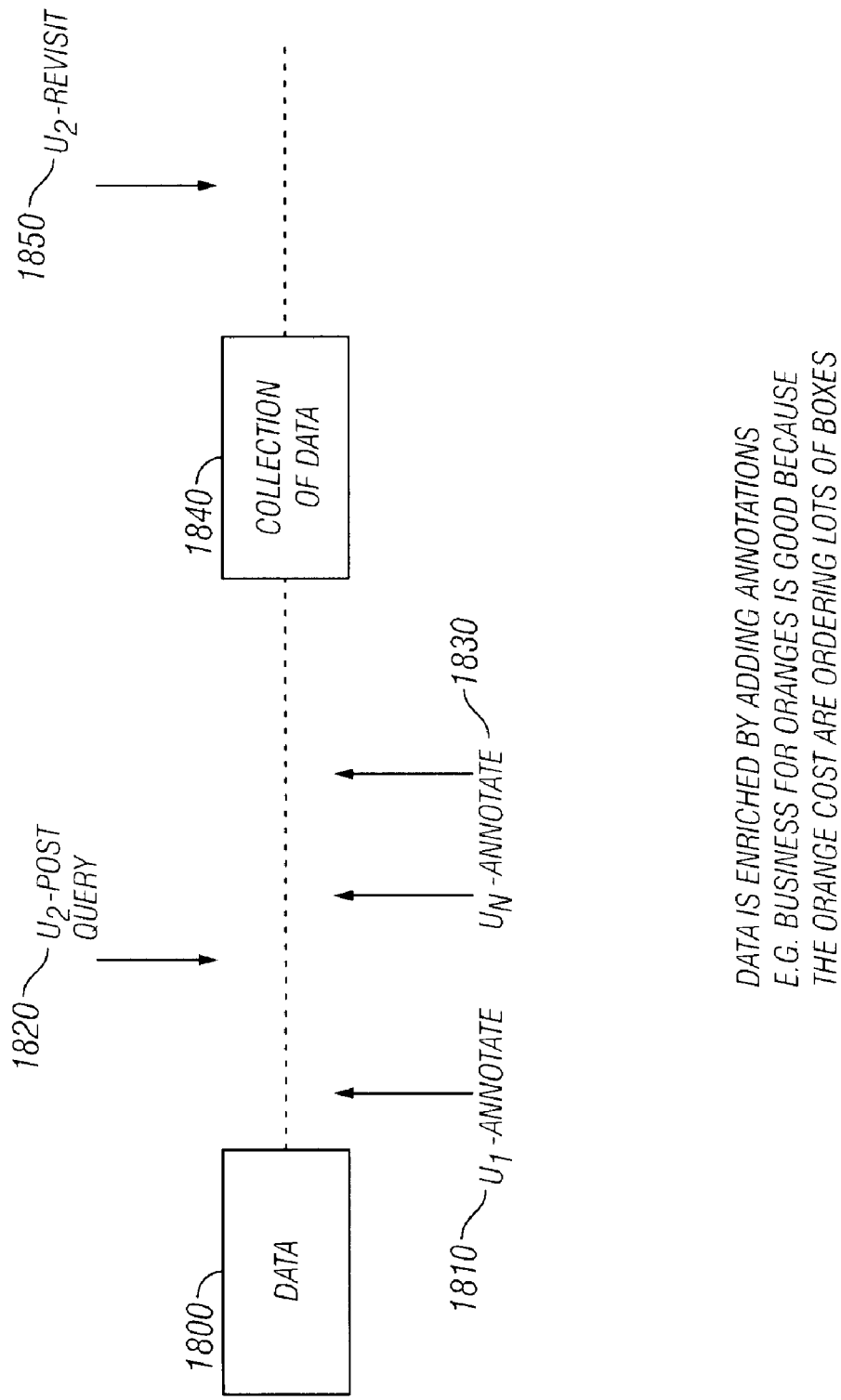
FIG. 18 is a flow diagram showing a multi-user, collaborative work flow for answering questions according to the invention.
Figures 19B, 19C:
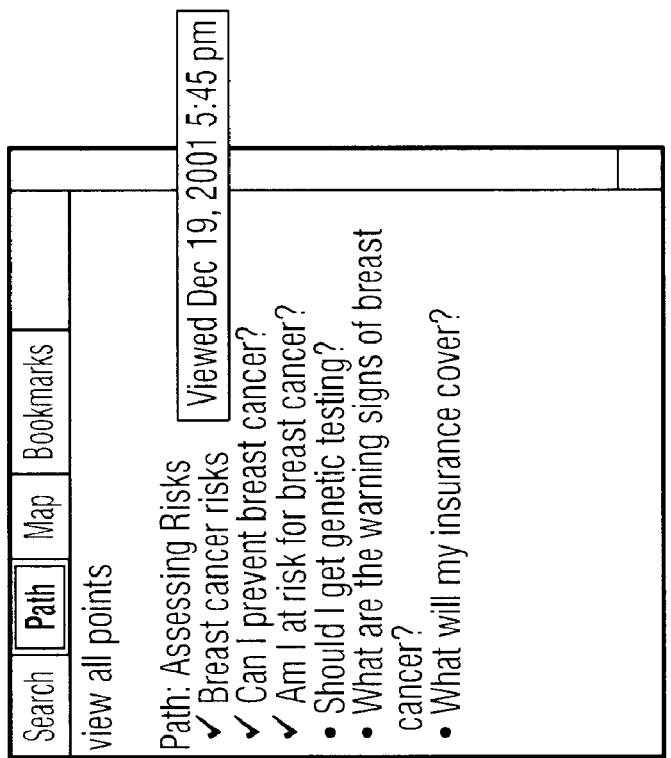
Figure 19D:
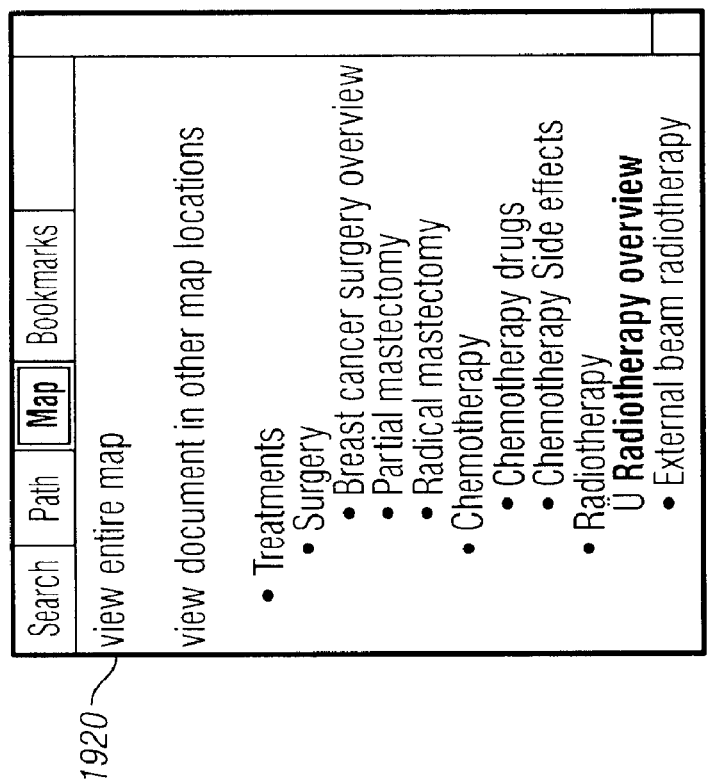
Figure 19E:
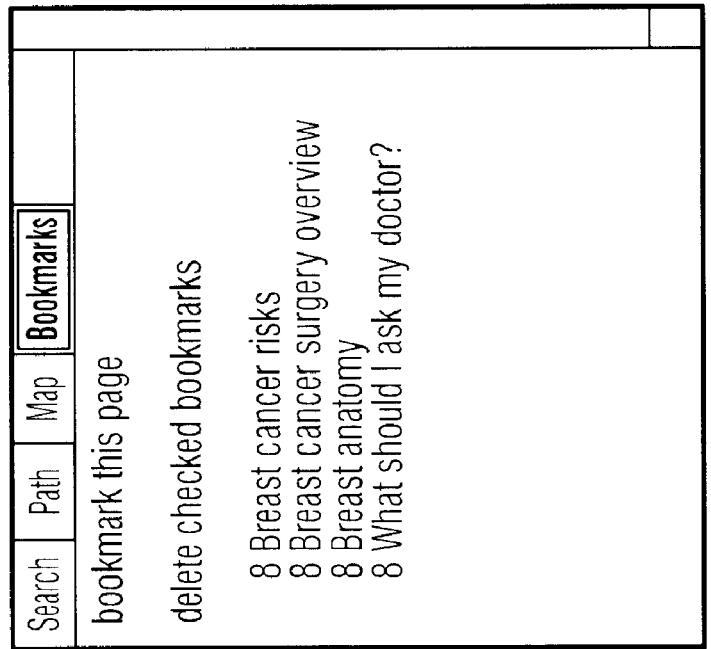

FIG. 18 illustrates the process of enriching data 1800 through the addition of annotations. In this example, data are located within the universe of available information. Such data 1800 for example could be related to oranges. A first user U1 provides annotations 1810 with regard to this data, at some latter point a second user U2 posts a query with regard to the information 1820. Additional annotations are then provided by further users through an ultimate user $U_N$ 1830. The information now exists as a collection of data 1840 about oranges and annotations to that data: the information has been enriched by various annotations provided in response to the query of the user U2. At some later point in time user U2 may revisit the data 1850. In this example, the interaction of various users with regard to a body of data has created a set of annotations that allows the user U2 to discover information about the data. In the case of oranges, for example, users may have provided various observations, such as "The orange companies have had good weather and expect a good crop", or "The orange companies are ordering lots of boxes". When a user posts a query, the results may help develop insights with regard to the information. For example, the query might be "Are the orange companies ordering new equipment?" In this case, the response might include knowledge about oranges as well as associated meta-knowledge, including the annotation. "The orange companies have ordered more machinery." The user is able to make use of patterns of data and annotations, such as the information that the orange industry is doing very well and would be a good place to make an investment, based on the insight developed from the cumulated knowledge that the weather is good, the orange companies are ordering more boxes, and they are ordering more machinery. This information would not otherwise be available by a simple query with regard to oranges. However, the Knowledge Web allows users to add annotations to information in such a way that patterns and information otherwise not available through a standard search can be developed, thereby resulting in valuable insights.

Display Elements

FIG. 19*a*-19*e* are illustrations of a user interface for the Knowledge Web as shown on a display 1115. In this example, there is a search field 1900 which allows a user 800 to enter searches and that also indicates the searcher's previous searches. There are also fields with regard to related documents 1905 which allow a searcher to investigate related areas, and a field with regard to document notes 1910. The user 800 is also allowed to choose a search path 1915, to view the document and other map locations, or to view an entire map 1920 of the documents and to bookmark 1925 the information. The user 800 is also provided with an opportunity to rate 1930 the information and thereby add his understanding of the value of the information. The actual search results are displayed to the user in the main pane 1935 of the display.

FIG. 20 shows a document fragment as presented to the user 800 on a display 1115 in context, as well as showing highlighted text from an activated comment 2000. In the display the gray text is the part of the document that is not part of the document fragment. The document fragment text remains untouched. The highlighted text, also known as the focus, is associated with the comment mark at the end of the paragraph. In this case, the user has clicked on the comment marker, and the Knowledge Web client has associated text with it. When the user clicks on the comment marker, the full comment text and any follow-up comments are displayed in the side-bar. A further box is displayed when the mouse rolls over the comment marker. This shows the first few lines of the comment, giving the user enough information to decide if the comment is worth looking at in more detail. See for example FIG. 19A, numeric designator 1940.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer database, comprising:
   a database store for receiving, storing, and allowing access to data concerning a plurality of topics, meta data created at a time of entry of said data, meta data comprising at least one annotation concerning said data, and meta data comprising access statistics concerning said data;
   a viewing tool for user access to said data in said database;
   an electronic tutor for maintaining a model of a user, and for finding useful data in said database to present to said user;
   an authoring tool for adding data into said database; and
   a data representation schema for organizing said database into explanations, topics, explanatory paths, and meta data representing information about and relationships between said data in said database;
   wherein an explanation comprises a piece of content that is linked with topics;
   wherein every explanation has links to at least one topic that it explains;
   wherein topics and explanations are linked by said paths;
   wherein said meta data comprises at least one annotation to said explanations and topics;
   wherein explanations also have links to topics that represent prerequisite data;
   wherein a topic comprises a cluster of concepts to be learned together by a user; wherein at least one topic comprises multiple subtopics;
   wherein at least one topic comprises a testable unit of data that contains no subtopics, and that represents a single entity such that a single question determines whether said user is familiar with said testable unit of data;
   wherein a path is a way of describing a sequence of explanations and queries, with branch points;
   wherein paths encode information about ways to learn a topic;
   wherein a path is connected to topics that it explains and topics that it depends on as prerequisites;
   wherein a path contains branch points that are based on answers to queries;
   wherein a path contains additional information indicating how a sequence is presented;
   wherein annotations are associated with at least one of: explanations, topics, paths, and other annotations; and
   wherein annotations do not modify an author's content, but add to it.

2. A computer database, comprising:
   a database store for receiving, storing, and allowing access to data concerning a plurality of topics, meta data created at a time of entry of said data, meta data comprising at least one annotation concerning said data, and meta data comprising access statistics concerning said data;
   a viewing tool for user access to said data in said database, wherein said viewing tool comprises means for choosing topics that a user wants to learn about, viewing explanations provided to said user as a sequence of presentations, and annotating said data in said database;
   an electronic tutor for maintaining a user learning model, and for finding useful data in said database to present to said user;
   an authoring tool for enabling an author to add data into said database;
   said means for choosing further comprising means for naming a topic via entering a word or phrase into a topic-search engine;
   wherein said viewing tool then displays a map of an area of a topic space said user selects, showing a current user level and attainable user levels;
   a topic map in which a space of topics and subtopics is illustrated as an n-dimensional landscape, with landmarks and links showing relationships between topics;
   wherein a coloring scheme shows said user's level and relative importance of said topic;
   wherein said topic map shows paths that said user has traveled before and paths that others have traveled before; and
   wherein said viewing tool allows said user to move through topic space by panning, zooming, and leaping from topic to related topic;
   wherein said viewing tool allows said user to zoom into relevant topics, look at their subtopics and mark things that are of interest, and to mark things that are already known;
   at least one registry handled by a registration server, wherein a registry comprises one of: a pen name registry, a content registry and a topic registry;
   wherein said registration server keeps a registry of all content in said database, including any explanations, queries, paths, and annotations;
   wherein said registration server keeps track of where information is, said author's pen name, and when said information was registered.

3. The system of claim 2, wherein collecting a simple poll via an optional voting scheme indicates whether a user liked an explanation; wherein an encryption scheme hides a user's identity, and wherein it is guaranteed that a user votes only once.

4. The system of claim 3, wherein said simple poll comprises a voting scheme comprising a user operated forward and back selection mechanism.

5. The system of claim 2, wherein users make annotations explicitly which contain descriptive information about how an annotation is related; wherein an annotation of this type is treated as content, and has an author who declares authorship of said annotation, and wherein only said author is authorized to modify or delete said annotation.

6. The system of claim 2, wherein said tutor keeps track of data about said user, and data about said database; and wherein all user-specific data are private and inaccessible to others.

7. The system of claim 6, wherein said tutor uses awareness of any of said user's age, language preferences, and reading level to choose and sort explanations.

8. The system of claim 6, wherein said tutor follows explicit paths that have been laid down by teachers, taking advantage of their suggestions about how to present said data.

9. The system of claim 6, further comprising:
at least one explanation having properties which comprise any of annotation for adding data into said database, and registration by which data is declared to exist as part of said database.

10. The system of claim 8, wherein registration is accomplished by submitting data to a registration server;
wherein before content is registered specific meta data is added and at least one datum is specified from a group of datum consisting of: an author, a creation date, a URL identifying where said data is stored, a list of topics, an explanation, a type of information specifying language, a media type, an explanation category, and a set of prerequisite topics, with a level of expertise specified for each topic.

11. The system of claim 2, further comprising:
a mechanism for helping to find topics corresponding to an explanation; wherein an author specifies a topic to which an explanation applies using a topic chooser; wherein an authoring tool then presents said author with a list of specific topics and/or subtopics, sorted according to how well they match said explanation; and wherein said author chooses at least one of said topics and/or subtopics.

12. The system of claim 2, wherein an author registers content under a pen name, wherein said pen name itself is registered with a pen name registry;
wherein pen names are unique identifiers; wherein said registration server does not register a same pen name to two different people; and
wherein a pen name is registered anonymously and is identified as such.

13. The system of claim 2, wherein said registration server keeps a hash-coded signature of registered content to verify that said content has not been changed.

14. The system of claim 2, wherein when an author registers content, said author affirms that said author has a right to publish said content.

15. The system of claim 2, wherein a topic registry keeps track of all topics and testable units of data.

16. The user interface of claim 2, further comprising:
a module for displaying a map of an area of topic space said user selects, showing a current user level and attainable user levels;
wherein said map illustrates a space of topics and subtopics as a two-dimensional landscape, with border, landmarks and links showing relationships between topics;
wherein said map implements a coloring scheme showing said user's level and relative importance of a topic; and
wherein said interface is able to create a map specifically for said user.

17. The user interface of claim 2, further comprising:
a topic map, drawn and colored in context, which depends both on what said user is trying to learn and on what other persons that said user trusts have judged to be important.

18. The user interface of claim 17, wherein said map allows said user to assess the size of each topic, and how long it takes said user to cover said topic; and
wherein said map shows paths that said user has traveled before and paths that other users have traveled before.

19. The user interface of claim 2, wherein said user interface allows said user to move through topic space by any of panning, zooming, and leaping from topic to related topic; and
wherein said user interface allows said user to zoom into relevant topics, look at their subtopics, and mark the things that are of interest, or that are already known.

20. The user interface of claim 2, wherein said user interface further comprises:
a simulation of a three-dimensional navigational space that enables said user to navigate through by any of moving forward/back, right/left, up/down, and rotating;
wherein said navigational space comprises a plurality of graphical objects which are any of three-dimensional and animated; and which have sounds associated with them that said user begins to hear as he draws near said object;
wherein there are links between said objects representing relationships between concepts they represent; wherein said links are almost transparent; wherein as said user moves near to an object, said links associated with said object become more visible, fading as a chain of connections gets farther from said object; and wherein as the user approaches a link, links of that type become more visible.

21. The user interface of claim 20, wherein objects are arranged in said navigational space in a systematic way according to a scheme; wherein a vertical dimension represents historical time; and wherein a horizontal dimension represents a theme; wherein said organization scheme is not fixed such that when said user changes said organization scheme, said objects reorganize themselves in a new order.

22. The user interface of claim 20, wherein said user moves through said navigational space to find and examine objects of interest, to visualize their relationships, and to visualize a context into which they fit.

23. The user interface of claim 2, wherein said user interface uses a spatial metaphor at all levels of a topic tree;
wherein at a top level a map represents topics maintained in a relationship to one another in a topic landscape, allowing said user to get to know an area of said topic landscape, and learn to navigate through said topic landscape;
wherein at a middle level, said topic map changes slowly;

wherein at a bottom, more detailed level, topics are more dynamic, and said topic map appears as a web of connections; and wherein a same subtopic appears on said map a plurality of times in different contexts.

24. The user interface of claim 2, wherein user visualization occurs as at least one of a timeline, a map, a topic map, a hierarchical display, a display of personal bookmarks, and a combination of said foregoing forms of visualization.

25. The user interface of claim 2, further comprising:

a display presented to said user;

means for allowing said user to select a search space; wherein said search space is any of a time line, a map view, an exploded map view, related topics, and a hierarchy.

26. The user interface of claim 2, wherein said user interface further comprises:

a simulation of a two-dimensional navigational space that said user navigates through by any of moving right/left and up/down;

wherein said navigational space comprises a plurality of graphical objects which are any of two-dimensional and animated; and which have sounds associated with them that said user begins to hear as he draws near said object; and wherein there are links between said objects representing relationships between concepts said objects represent; wherein said links are almost transparent; wherein as said user moves near to an object, said links associated with said object become more visible, fading as a chain of connections gets farther from said object; and wherein as the user approaches a link, links of that type become more visible.

27. A computer database comprising:

a database store for receiving, storing, and allowing access to;

a distributed registry for keeping track of where and how said data and associated meta data are stored in said database;

means for representing data objects in said database as nodes of a labeled graph, and representing said associated meta data by labeled links connecting said nodes;

wherein said nodes represent data of different types and in different formats, including text, image, sound, video, and structured data;

a metaweb server which has access to a user's security profile, and access to said distributed registry;

wherein said metaweb server obtains a location of data requested by said user, retrieves said data from data servers which themselves maintain rules regarding access to retrieve and update data from said data servers, and assembles said data into coherent data structures;

wherein each object is registered in said registry;

wherein said registry keeps track of where data and meta data associated with an object are stored;

wherein every data object has a unique index which is used to access the registry;

wherein said apparatus retrieves said data object from said index by assembling components of data and meta data from various storage devices across a network; and a viewing tool for accessing said data in said database, wherein said viewing tool comprises means for choosing topics that said user wants to learn about, viewing explanations provided to said user as a sequence of presentations, and accepting annotations from said user;

said viewing tool further comprising:

a module for allowing said user to navigate through links, see patterns in connections, and reorganize information according to multiple navigational schemes;

a module for allowing user to see the detailed local information, and also to see how that information fits into a broader global context; and a topic search engine for selecting at least one topic that a user wants to learn about.

28. The apparatus of claim 27, further comprising:

a hash module, wherein when a data object is registered, said data object type and content are used to generate a fast, unique hash value, which is used as an index into said registry; wherein said index is used to identify said data object in said registry and is used as an index in a registry hash table comprising a plurality of said hash values.

29. The apparatus of claim 27, wherein said registry further comprises:

a hash to an index to keep track of a descriptor for allowing a data object to be constructed from data stored in multiple locations.

30. The apparatus of claim 27, wherein said registry further comprises:

a hash to an index to keep track of a descriptor for allowing a data object to be stored redundantly in multiple locations.

31. The apparatus of claim 27, wherein said registry further comprises:

a hash to an index to keep track of a descriptor for allowing a data object to be stored in a different location than that of associated meta data.

32. The apparatus of claim 27, wherein said registry further comprises:

a hash to an index to keep track of a descriptor of a node of a labeled graph stored in multiple locations.

33. The apparatus of claim 27, wherein said registry further comprises:

an access process comprising a fast hash and a cryptographically strong signature.

34. The apparatus of claim 27, wherein said registry further comprises:

an hierarchical distributed cache.

35. The apparatus of claim 27, wherein said metaweb server which operates in conjunction with a front end and a data server for determining user access privileges.

36. The apparatus of claim 27, further comprising:

means for storing a user profile in a same graph as said data.

37. A computer implemented data object registry method, comprising the steps of:

providing a data object registry for registering data objects;

providing a database for receiving, storing, and allowing access to data objects concerning a plurality of topics, meta data created at a time of entry of said data, meta data comprising at least one annotation concerning said data, and meta data comprising access statistics concerning said data;

providing a viewing tool for allowing user access to data in said database;

representing a plurality of registered data objects in said data registry as a hash table entry;

wherein each hash table entry identifies a corresponding data object's location, representation, and any associated meta data; and wherein each hash table entry comprises an index hash, a cryptographically strong signature for verification and security, a data identifier, and a meta data identifier; and using said viewing tool to access data objects in said database via said data object reentry.

38. The method of claim 37, wherein said data identifier describes said data object's type, length, and at least one representation of said object's data.

39. The method of claim 37, wherein said hash table entry contains a meta data identifier which includes an indication of annotations of said data object.

40. The method of claim 37, wherein said index hash that is computed using a padding algorithm applied to all data to ensure it is of sufficient length.

41. The method of claim 40, wherein said padding algorithm comprises the steps of:
  receiving a request for N words of data;
  performing a test to determine if there are N words of data in a buffer;
    if there are N words of data in said buffer, returning said data;
    if there are not N words of data in said buffer, filling as much of said buffer as possible with data;
  performing a test to determine if said buffer is full;
    if said buffer is full, returning said data;
    if said buffer is not full, performing a test to determine if there are any data in said buffer;
      if there are not any data in said buffer, returning a null value;
      if there are data in said buffer, appending a byte value representing a number of words needed to fill said buffer and performing a test to determine if said buffer is full;
        if said buffer is full, returning said data are returned;
        if said buffer is not full, appending said data in said buffer up to a first added byte;
        thereafter, performing a test to determine if said buffer is full;
          if said buffer is full, returning said data;
          if said buffer is not full, again appending a byte value representing a number of words needed to fill up said buffer; and
  continuing.

42. The method of claim 37, further comprising the step of:
  computing a signature of a data object using a data object type and content; and
  wherein said signature is computed using a cryptographically strong technique.

43. The method of claim 37, further comprising the step of:
  providing a data identifier that contains a data object's type, length, and representation;
  wherein a data object's representation contains at least one segment; and
  wherein for each segment, said data identifier contains information denoting how to find a string of bits that represent a part of said data object.

44. The method of claim 37, wherein said data object is constructed by obtaining bits associated with each segment, concatenating them together sequentially, and interpreting them as specified by type; and
  wherein once all of said bits are collected, said bits are verified by comparing an index hash computed from concatenated data and a type with said index hash stored in said hash table.

45. The method of claim 37, further comprising the step of:
  providing a meta data identifier that contains at least one component that indicates type and location of at least one link annotating said data object;
  wherein each meta data component specifies multiple alternative locations where meta data are found; and
  wherein each location has a type specifying a format of meta data stored in that location.

46. The method of claim 45, wherein meta data for an object are constructed by obtaining data from one location indicated by each component; and
  wherein said meta data are then collected and interpreted based on each location's type.

* * * * *

UNITED STATES PATENT AND TRADEMARK OFFICE
CERTIFICATE OF CORRECTION

PATENT NO. : 7,502,770 B2  Page 1 of 1
APPLICATION NO. : 10/474155
DATED : March 10, 2009
INVENTOR(S) : W. Daniel Hillis and Bran Ferren It is certified that error appears in the above-identified patent and that said Letters Patent is hereby corrected as shown below:

Title Page add item (60) - RELATED U.S. APPLICATION DATA:

--Provisional Application No. 60/283,158 filed April 11, 2001--
--Provisional Application No. 60/343,273 filed December 21, 2001--

Signed and Sealed this

Eleventh Day of August, 2009

David J. Kappos
*Director of the United States Patent and Trademark Office*